(12) United States Patent
Kumar et al.

(10) Patent No.: US 11,006,384 B2
(45) Date of Patent: May 11, 2021

(54) METHODS AND SYSTEMS FOR USING BANDWIDTH PARTS INFORMATION DURING POSITIONING OF A MOBILE DEVICE

(71) Applicant: QUALCOMM Incorporated, San Diego, CA (US)

(72) Inventors: Akash Kumar, Hyderabad (IN); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/826,932

(22) Filed: Mar. 23, 2020

(65) Prior Publication Data

US 2020/0314793 A1 Oct. 1, 2020

(30) Foreign Application Priority Data

Mar. 28, 2019 (IN) .............................. 201941012254

(51) Int. Cl.
*H04W 24/00* (2009.01)
*H04W 64/00* (2009.01)
(Continued)

(52) U.S. Cl.
CPC ......... *H04W 64/003* (2013.01); *H04L 5/0048* (2013.01); *H04W 4/029* (2018.02); *H04W 24/10* (2013.01); *H04W 72/0453* (2013.01)

(58) Field of Classification Search
CPC ... H04W 64/003; H04W 4/029; H04W 24/00; H04W 72/0453; H04L 5/0048
(Continued)

(56) References Cited

U.S. PATENT DOCUMENTS

2012/0244875 A1\* 9/2012 Cardona ............... G01S 5/0252
455/456.1
2018/0039934 A1\* 2/2018 Mulaosmanovic .. G06Q 10/087
(Continued)

FOREIGN PATENT DOCUMENTS

WO WO-2020067848 A1 4/2020

OTHER PUBLICATIONS

Intel Corporation: "Summary for NR-Positioning AI-7.2.10.1.2 UL only Based Positioning", 3GPP Draft, R1-1903395-Intel-NR Pos AI 7.2.10.1.2-UL Pos, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 26, 2019 (Feb. 26, 2019), XP051601070, 12 pages, Retrieved from the Internet: URL: http://www.3gpp.org/ftp/tsg%5Fran/WG1%5FRL1/TSGR1%5F96/Docs/R1%2D1903395%2Ezip. [retrieved on Feb. 26, 2019] section 2.2 Aspect #2.

(Continued)

*Primary Examiner* — Danh C Le
(74) *Attorney, Agent, or Firm* — Paradice and Li LLP

(57) ABSTRACT

Bandwidth Parts (BWPs) are used for the transmission and measurement of positioning reference signals during a positioning session. A location server may obtain relevant BWP information, such as the active BWP or a list of configured BWPs, from one or more base stations and/or the user equipment (UE) for the positioning session. The location server may provide assistance data to the UE that is determined based on the BWP information, so that the UE may measure PRS signals from intra-frequency base stations. The location server may further determine a preferred BWP or prohibited BWPs, which may be forwarded to the serving base station to control the BWPs that are used during the positioning session.

40 Claims, 12 Drawing Sheets

(51) Int. Cl.
*H04L 5/00* (2006.01)
*H04W 4/029* (2018.01)
*H04W 72/04* (2009.01)
*H04W 24/10* (2009.01)

(58) Field of Classification Search
USPC .............. 455/456.1, 456.5, 456.6, 550.1
See application file for complete search history.

(56) References Cited

U.S. PATENT DOCUMENTS

| | | | |
|---|---|---|---|
| 2019/0053010 A1* | 2/2019 | Edge | H04W 64/00 |
| 2019/0159182 A1* | 5/2019 | Ranta-aho | H04L 5/0094 |
| 2019/0261244 A1* | 8/2019 | Jung | H04W 36/305 |
| 2019/0313437 A1* | 10/2019 | Jung | H04L 5/0053 |
| 2019/0349983 A1* | 11/2019 | Loehr | H04W 52/242 |
| 2020/0169831 A1* | 5/2020 | Li | H04W 4/02 |
| 2020/0259627 A1* | 8/2020 | Loehr | H04W 72/042 |
| 2020/0333424 A1* | 10/2020 | Shi | H04W 24/10 |

OTHER PUBLICATIONS

International Search Report and Written Opinion—PCT/US2020/024418—ISA/EPO—dated Aug. 11, 2020.
QUALCOMM Incorporated: "UL Reference Signals for NR Positioning", 3GPP DRaft, R1-1911133, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 5, 2019 (Oct. 5, 2019), XP051808856, 7 pages, Retrieved from the Internet: URL: https://ftp.3gpp.org/tsg_ran/WG1_RL1/TSGR1_98b/Docs/R1-1911133.zip. [retrieved on Oct. 5, 2019] the whole document.

* cited by examiner

METHODS AND SYSTEMS FOR USING BANDWIDTH PARTS INFORMATION DURING POSITIONING OF A MOBILE DEVICE

CLAIM OF PRIORITY UNDER 35 U.S.C. § 119

This application claims under 35 USC § 119 the benefit of and priority to India Provisional Application No. 201941012254, filed Mar. 28, 2019, and entitled "METHODS AND SYSTEMS FOR NRPPa ENHANCEMENTS FOR 5G NR," which is assigned to the assignee hereof and is incorporated herein by reference in its entirety.

BACKGROUND

Field of the Disclosure

Aspects of the disclosure relate to systems and architectures to support location services in a 5G Next Generation Radio Access Network (NG-RAN).

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). A fifth generation (5G) New Radio (NR) standard calls for higher data transfer speeds, greater numbers of connections, and better coverage, among other improvements. The 5G NR, according to the Next Generation Mobile Networks Alliance, is designed to provide data rates of several tens of megabits per second to each of tens of thousands of users, with 1 gigabit per second to tens of workers on an office floor.

For some applications, it may be useful or essential to be able to obtain a location of a mobile device through a wireless communication systems, in the absence of support from a Global Navigation Satellite System (GNSS) such as GPS. GLONASS or Galileo. For example, this may apply for a mobile device that is indoors or in a dense urban canyon when tracking of the mobile device is needed for such applications as navigation assistance, public safety support or management of moving objects in a factory or warehouse. In such cases, a non-GNSS means of reliably and quickly locating a mobile device may be of value.

SUMMARY

Bandwidth Parts (BWP) are used in the transmission and measurement of positioning reference signals during a positioning session. A location server may obtain relevant BWP information, such as the active BWP or a list of configured BWPs, from one or more base stations and/or the user equipment (UE) for the positioning session. The location server may provide assistance data to the UE that is determined based on the BWP information, so that the UE may measure PRS signals from intra-frequency base stations. The location server may further determine a preferred BWP or prohibited BWPs, which may be forwarded to the serving base station to control the BWPs that are used during the positioning session.

In one implementation, a method for supporting location of a user equipment (UE) performed by a location server in a wireless network includes sending a request for Bandwidth Part (BWP) information to a first entity, wherein the first entity comprises the UE or a serving New Radio (NR) Node B (gNB) in the wireless network that is serving the UE; receiving a response with BWP information from the first entity; determining assistance data using the BWP information; sending the assistance data to the UE; receiving from the UE location information measured by the UE using the assistance data; and determining the a location of the UE based on the location information.

In one implementation, a location server in a wireless network configured to support location determination of a user equipment (UE) includes a network interface configured to communicate with entities in the wireless network; at least one memory; and at least one processor coupled to the network interface and the at least one memory, the at least one processor configured to: send a request for Bandwidth Part (BWP) information to a first entity, via the network interface, wherein the first entity comprises the UE or a serving New Radio (NR) Node B (gNB) in the wireless network that is serving the UE; receive a response with BWP information from the first entity via the network interface; determine assistance data using the BWP information; send the assistance data to the UE via the network interface; receive from the UE, via the network interface, location information measured by the UE using the assistance data; and determine a location of the UE based on the location information.

In one implementation, a location server in a wireless network configured to support location determination of a user equipment (UE), includes means for sending a request for Bandwidth Part (BWP) information to a first entity, wherein the first entity comprises the UE or a serving New Radio (NR) Node B (gNB) in the wireless network that is serving the UE; means for receiving a response with BWP information from the first entity; means for determining assistance data using the BWP information; means for sending the assistance data to the UE; means for receiving from the UE location information measured by the UE using the assistance data; and means for determining a location of the UE based on the location information.

In one implementation, a non-transitory storage medium including program code stored thereon, the program code is operable to cause at least one processor in a location server in a wireless network to support location determination of a user equipment (UE), includes program code to send a request for Bandwidth Part (BWP) information to a first entity, wherein the first entity comprises the UE or a serving New Radio (NR) Node B (gNB) in the wireless network that is serving the UE; program code to receive a response with BWP information from the first entity; program code to determine assistance data using the BWP information; program code to send the assistance data to the UE; program code to receive from the UE location information measured by the UE using the assistance data; and program code to determine a location of the UE based on the location information.

In one implementation, method for supporting location of a user equipment (UE) performed by a New Radio (NR) Node B (gNB) in a wireless network that is serving the UE, includes receiving a request for Bandwidth Part (BWP) information from a location server; sending a response with BWP information to the location server; forwarding assistance data determined by the location server using the BWP information to the UE; transmitting positioning reference signals to be measured by the UE; and forwarding location information measured from the positioning reference signals by the UE using the assistance data to the location server, wherein a location of the UE is determined by the location server based on the location information.

In one implementation, a New Radio (NR) Node B (gNB) in a wireless network that is serving a user equipment (UE), the NR gNB configured to support location determination of the UE, includes at least one external interface configured to communicate with entities in the wireless network; at least one memory; and at least one processor coupled to the at least one external interface and the at least one memory, the at least one processor configured to: receive a request for Bandwidth Part (BWP) information from a location server via the at least one external interface; send a response with BWP information to the location server via the at least one external interface; forward assistance data determined by the location server using the BWP information to the UE via the at least one external interface; transmit positioning reference signals to be measured by the UE via the at least one external interface; and forward location information measured from the positioning reference signals by the UE using the assistance data to the location server via the at least one external interface, wherein a location of the UE is determined by the location server based on the location information.

In one implementation, a New Radio (NR) Node B (gNB) in a wireless network that is serving a user equipment (UE), the NR gNB configured to support location determination of the UE, includes means for receiving a request for Bandwidth Part (BWP) information from a location server; means for sending a response with BWP information to the location server; forwarding assistance data determined by the location server using the BWP information to the UE; means for transmitting positioning reference signals to be measured by the UE; and means for forwarding location information measured from the positioning reference signals by the UE using the assistance data to the location server, wherein a location of the UE is determined by the location server based on the location information.

In one implementation, a non-transitory storage medium including program code stored thereon, the program code is operable to cause at least one processor in a New Radio (NR) Node B (gNB) in a wireless network that is serving a user equipment (UE) to support location determination of the UE, includes program code to receiving a request for Bandwidth Part (BWP) information from a location server; program code to send a response with BWP information to the location server; program code to forward assistance data determined by the location server using the BWP information to the UE; program code to transmit positioning reference signals to be measured by the UE; and program code to forward location information measured from the positioning reference signals by the UE using the assistance data to the location server, wherein a location of the UE is determined by the location server based on the location information.

In one implementation, a method for supporting location of a user equipment (UE) performed by the UE, includes receiving a request for Bandwidth Part (BWP) information from a location server in a wireless network; sending a response with BWP information to the location server; receiving assistance data from the location server, wherein the location server determines the assistance data using the BWP information; measuring location information from positioning reference signals from a serving New Radio (NR) Node B (gNB) in the wireless network and neighbor gNBs using the assistance data; and sending the location information to the location server, wherein the location server determines a location of the UE based on the location information.

In one implementation, a user equipment (UE) configured to support location determination of the UE, includes an external interface configured to wirelessly communicate with entities in a wireless network; at least one memory; and at least one processor coupled to the external interface and the at least one memory, the at least one processor configured to: receive a request for Bandwidth Part (BWP) information from a location server in the wireless network via the external interface; send a response with BWP information to the location server via the external interface; receive assistance data from the location server via the external interface, wherein the location server determines the assistance data using the BWP information; measure location information from positioning reference signals from a serving New Radio (NR) Node B (gNB) in the wireless network and neighbor gNBs using the assistance data via the external interface; and send the location information to the location server via the external interface, wherein the location server determines a location of the UE based on the location information.

In one implementation, a user equipment (UE) configured to support location determination of the UE, includes means for receiving a request for Bandwidth Part (BWP) information from a location server in a wireless network; means for sending a response with BWP information to the location server; means for receiving assistance data from the location server, wherein the location server determines the assistance data using the BWP information; means for measuring location information from positioning reference signals from a serving New Radio (NR) Node B (gNB) in the wireless network and neighbor gNBs using the assistance data; and means for sending the location information to the location server, wherein the location server determines a location of the UE based on the location information.

In one implementation, a non-transitory storage medium including program code stored thereon, the program code is operable to cause at least one processor in a user equipment (UE) to support location determination, includes program code to receive a request for Bandwidth Part (BWP) information from a location server in a wireless network; program code to send a response with BWP information to the location server; program code to receive assistance data from the location server, wherein the location server determines the assistance data using the BWP information; program code to measure location information from positioning reference signals from a serving New Radio (NR) Node B (gNB) in the wireless network and neighbor gNBs using the assistance data; and program code to send the location information to the location server, wherein the location server determines a location of the UE based on the location information.

Figure 1:
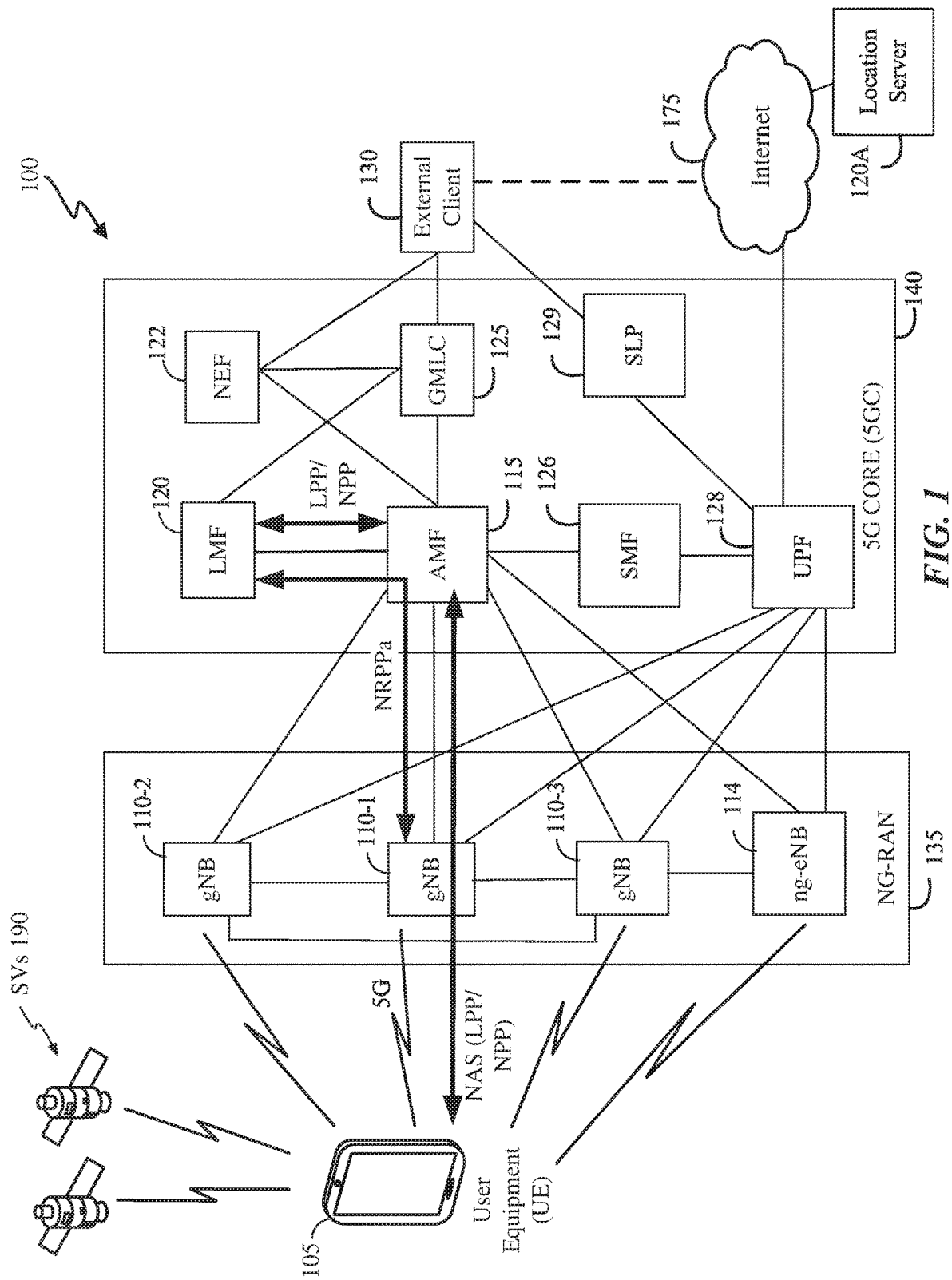
FIG. 1 is a diagram of an example communication system that may utilize a 5G network to determine a position for a mobile device, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c* etc. When referring to such an element using only the first number, any instance of the element is to be understood (e.g. element 110 in the previous example would refer to elements 110-1, 110-2 and 110-3 or to elements 110*a*, 110*b* and 110*c*).

DETAILED DESCRIPTION

Obtaining the location of a mobile device, sometimes referred to herein as user equipment (UE), that is accessing a wireless network may be useful for many applications including, for example, emergency calls, personal navigation, asset tracking, managing the movement of objects and tools in a factory or warehouse, locating a friend or family member, etc. The terms "location", "location estimate", "position", "position estimate" and "position fix" are synonymous and are used interchangeably herein.

When a satellite position system is not available to a UE, such as when the UE is indoors, various positioning procedures through an access wireless network may be used. For example, one example of such a positioning procedure is Observed Time Difference of Arrival (OTDOA), which may be used to produce highly accurate location of the UE. In OTDOA positioning, the UE may measure time differences between downlink (DL) signals received from a plurality of base stations. Because the positions and the timing differences for the base stations can be known, the observed time differences between DL signals received at the UE from the base stations may be used to calculate the location of the UE (e.g. using multilateration techniques). In OTDOA, the UE typically measures the time of arrival (TOA) of DL signals, e.g., PRS (Positioning Reference Signals), received from a reference cell (e.g., the serving cell) and one or more neighboring cells. The TOA for the reference cell is subtracted from the TOA for each of the neighbor cells to determine a Reference Signal Time Difference (RSTD) between the reference cell and each neighbor cell. The RSTD measurements may be used by the UE to determine its location using UE based positioning (e.g. if additional information such as the real time differences (RTDs) between pairs of base stations and the base station locations are provided to the UE by a location server). Alternatively, the UE may report the RSTD measurements to a location server. The location server may then generate a position fix for the UE through multilateration techniques using the reported measurements and the known locations and RTDs for the base stations. Other examples of positioning procedures available through a wireless network include, but are not limited to, angle of arrival (AOA), angle of departure (AOD), and multi-Round Trip Time (multi-RTT) (also referred to as multi-cell RTT).

Location based measurements by the UE can involve both intra and inter-frequency measurements. Intra-frequency measurements typically occur when the signals measured by the UE from the reference cell and neighbor cell (or from any non-serving cell) are at the same frequency (or frequencies) as signals which may be transmitted to and received by the UE from a serving base station (e.g. from a serving cell) for the UE. Inter-frequency measurements occur when the signals measured by the UE from the reference cell and/or neighbor cell (or from any non-serving cell) are at different frequencies from one another and/or from signals which may be transmitted to and received by the UE from a serving base station (e.g. from a serving cell) for the UE, and may require the UE to request Measurement Gaps (MGs) from the network (e.g. from the serving base station). Network operators may prefer the use of intra-frequency measurement-based positioning because this can reduce measurement delay and can interfere less with normal UE operation.

5G NR may be deployed with wide carrier bandwidths, e.g., with 100 MHz maximum bandwidth possible for NR Frequency Range 1 (FR1) and 400 MHz maximum bandwidth possible for NR FR2. Additionally, 5G NR employs the concept of a Bandwidth Part (BWP), in which the network schedules the UE only in a specific subset of frequencies within the total available carrier bandwidth. The BWP assigned to a UE can be changed (or switched) by the network (e.g. by a serving base station) as frequently as in every Downlink Control Information (DCI) sent in a Physical Downlink Control Channel (PDCCH). When there is a change in BWP for the serving cell, which is acting as the reference cell for OTDOA, the neighbor cell for OTDOA can change from an intra frequency type to an inter frequency type, which is not preferred for positioning. Moreover, the location server may be unaware of the UE's BWP and there are no enhancements in 5G NR positioning specifications to handle the BWP change during the positioning session.

As described herein. BWP information may be used during positioning of a UE, e.g., in 5G NR or any other wireless communication network that uses BWP. For example, with 5G NR, every base station configures up to four BWPs and uses/activates one of the BWPs for scheduling of any UE. Accordingly, in some implementations, a location server (e.g. an LMF) may query the serving base station (e.g. a gNB) to obtain the active BWP for a UE and a list of the configured BWPs, e.g., using New Radio Position Protocol A (NRPPa), as defined in Technical Specification (TS) 38.455 for the Third Generation Partnership Project (3GPP). The location server may additionally specify the estimated positioning session time for the UE to the base station, and in response, the base station may provide a reduced list of BWPs which the base station expects to activate for the UE during the estimated session time. The base station may further respond with the BWP details for transmission as well and its association with receive (Rx) BWPs (for paired spectrum) which may be useful in interference mitigation as discussed below. Based on the base station scheduler algorithm, the base station may also indicate the BWP switching pattern for the cell if known. The location server may use this additional information to determine positioning assistance data for the UE based on the active BWP and the possible active BWPs within the positioning session time. The location server may include (e.g. may indicate) base stations (or neighbor cells) in the assistance data sent to the UE which are intra-frequency with respect to the active BWP for the UE to enable intra-frequency RSTD measurements by the UE (or other types of intra-frequency measurements such as intra-frequency RSRP or RxTx measurements), in which the radio frequency and digital transceiver in the UE are tuned to only the BWP bandwidth. The location server may additionally re-order a base station (or neighbor cell) list, sent as assistance data to the UE, as appropriate based on the BWP switching pattern received from the serving base station so that the UE can measure location information from the base stations even after a BWP switch that are intra-frequency with respect to the new BWP. Thus, the location server can be aware of the UE BWPs so that the location server may include intra-frequency base stations in the assistance data sent to the UE based on the active and configured BWPs and not based on the active carrier frequency/bandwidth for serving base station.

In another implementation, the UE, rather than the serving base station, may report the active BWP for the UE and/or the configured BWPs for the serving base station during a capability (or other) exchange with the location server, e.g., using Long Term Evolution (LTE) Positioning Protocol (LPP), and the location server may adapt its assistance data accordingly. For an on-demand request by a UE for positioning reference signals (PRSs), a UE may first look at the configured BWPs for the serving base station and the active BWP for the UE, and may request PRS transmission from the serving base station and neighbor base stations on the active BWP or on expected new BWPs so that the UE may measure PRS without any inter-frequency measurement, even if a BWP switch is triggered from the network. In another implementation, an ordered list of BWPs, in order of preference, may be requested by a UE for on-demand PRS based on the usage of BWPs by the UE in the past from the serving base station. For example, if a BWP is most frequently used for the UE, the UE may rank that BWP higher than other BWPs in the ordered list of BWPs.

In some implementations, the location server may not be able to generate good assistance data (e.g., with a good geometry of base stations relative to the location of a UE) based on the active BWP (and/or configured BWPs) for the UE, e.g., if neighbor base stations are not available with those BWPs. The location server may then specify a preferred BWP to the serving base station for the UE during the positioning session with the UE. The preferred BWP may be a singleton or a list (e.g., a subset of configured BWPs) from which the location server can construct good assistance data with infra-frequency neighbor cells. The preferred BWP may be used by the serving base station for communication as well as positioning if the location server needs the serving base station to use a specific BWP for the UE during the positioning session and the serving base station may avoid any BWP switching during the positioning session until all the neighbor measurements are done. Once the positioning session is done, the base station may fall back to its default behavior and may follow its own BWP switching pattern.

In some implementations, the location server may specifically prohibit BWPs from being assigned by a serving base station for a specific UE. The prohibited BWPs may be a singleton element or a list (e.g., a subset of configured BWPs). For example, in one use case, the location server may request the serving base station not to use certain configured BWPs for a specific UE during a positioning session because there are no neighbor base stations for measurement that are intra-frequency with respect to these BWPs. In another use case, the location server may request the base station not to use certain configured BWPs for a specific UE during a positioning session for interference management during the positioning session, which may affect the measurements (both 5G NR based radio measurement and multi-band GNSS measurement) and lead to poor position fixes. For example, a switch to a DL BWP inherently triggers a BWP switch to the UL as well for both paired and unpaired spectrum. Knowledge of UL transmissions causing self-interference is known a priori, such as which UL bands transmission de-senses which GNSS bands or other 5G NR receivers. Thus, the location server may use this function to request base stations to prohibit the use of certain BWPs during positioning session that may cause de-sense during the measurement of the other 5G NR neighbor base stations either directly or Inter-Mod products from the active transmitters or to the GNSS receiver.

FIG. 1 shows a diagram of a communication system 100, according to an embodiment. The communication system 100 may be configured to support BWP during positioning of a UE 105, as described herein. Here, the communication system 100 comprises a UE 105, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in 3GPP. Accordingly, NG-RAN 135 and 5GC 140 may conform to current or future standards for 5G support from 3GPP. The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, next generation evolved Node Bs (ng-eNBs) 114. AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G. Long Term Evolution (LTE), etc. Implementations described herein (be they for 5G technology or for other communication technologies and protocols) may be used to configure and support a location server function being included in the RAN.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM). Code Division Multiple Access (CDMA). Wideband CDMA (WCDMA), LTE. High Rate Packet Data (HRPD), IEEE 802.11 WiFi (also referred to as Wi-Fi). Bluetooth® (BT), Worldwide Interoperability for Microwave Access (WiMAX), 5G New Radio (NR) (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (via elements of 5GC 140 not shown in FIG. 1, or possibly via a Gateway Mobile Location Center (GMLC) 125) and/or allow the external client 130 to receive location information regarding the UE 105 (e.g., via the GMLC 125).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1 comprise NR NodeBs, also referred to as gNBs, 110-1, 110-2 and 110-3 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 105 via wireless communication between the UE 105 and one or more of the gNBs 110, which may provide wireless communications access to the 5GC 140 on behalf of the UE 105 using 5G NR. 5G NR radio access may also be referred to as NR radio access or as 5G radio access and may be as defined by the Third Generation Partnership Project (3GPP). In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. A Location Management Component (LMC) (also referred to as a "local LMF") within the NG-RAN 135 (not shown in FIG. 1), such as within the serving gNB 110-1 or separate from and connected to the serving gNB 110-1, may perform the location server function discussed herein and may function similarly to LMF 120.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135—e.g. directly or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons, which may transmit signals (e.g. PRS signals) and/or may broadcast assistance data to assist positioning of UE 105 but may not receive signals from UE 105 or from other UEs. It is noted that while only one ng-eNB 114 is shown in FIG. 1, some embodiments may include multiple ng-eNBs 114. In some implementations, gNBs 110 and/or ng-eNBs 114 may support location of a UE 105—e.g. by requesting location measurements of PRS transmission from UE 105 and determining a location estimate for UE 105 using the PRS location measurements and other known information such as the locations of the antennas which transmit the measured PRS. In some embodiments, location of UE 105 by a gNB 110 or ng-eNB 114 may be in response to a location request for UE 105 received by the gNB 110 or ng-eNB 114 from the UE 105, from the AMF 115 or from the LMF 120.

As will be discussed in greater detail below, in some embodiments, the gNBs 110 and/or ng-eNB 114 (alone or in combination with other modules/units of the communication system 100) may be configured (e.g. in response to receiving a request from a UE 105, LMF 120 or another gNB 110 or another ng-eNB 114) to transmit PRS using BWP. As noted, while FIG. 1 depicts nodes configured to communicate according to 5G NR and LTE communication protocols for an NG-RAN 135, nodes configured to communicate according to other communication protocols may be used, such as, for example, an LTE protocol for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The methods and techniques described herein for support of support of BWP for UE 105 positioning may be applicable to such other networks.

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE accesses the NG-RAN 135 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), multi-Round Trip Time (multi-RTT), angle of arrival (AOA), angle of departure (AOD), time of arrival (TOA), and/or other positioning procedures. The LMF 120 may also process location services requests for the UE 105, e.g., received from the AMF 115 or from the GMLC 125. The LMF 120 may be connected to AMF 115 and/or to GMLC 125. In some embodiments, a node/system that implements the LMF 120 may additionally or alternatively implement other types of location-support modules, such as an Enhanced Serving Mobile Location Center (E-SMLC). It is noted that in some embodiments, at least part of the positioning functionality (including derivation of a UE 105's location) may be performed at the UE 105 (e.g., using signal measurements obtained by UE 105 for signals transmitted by wireless nodes such as gNBs 110 and ng-eNB 114, and assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115, and the GMLC 125 may then return the location response (e.g., containing the location estimate) to the external client 130. The GMLC 125 is shown connected to both the AMF 115 and LMF 120 in FIG. 1 though only one of these connections may be supported by 5GC 140 in some implementations.

A Network Exposure Function (NEF) 122 may be included in 5GC 140. The NEF 122 may support secure exposure of capabilities and events concerning 5GC 140 and UE 105 to an external client 130 and may enable secure provision of information from external client 130 to 5GC 140. In the context of location services, NEF 122 may function to obtain a current or last known location for a UE 105, may obtain an indication of a change in location for a UE 105, or an indication of when a UE 105 becomes available (or reachable). The NEF 122 may be connected to the GMLC 125 to support last known location, current location and/or deferred periodic and triggered location for the UE 105 by sending requests to and receiving responses from GMLC 125. NEF 122 may also or instead be connected to AMF 115 to support last known location, current location and/or deferred periodic and triggered location for the UE 105 by sending requests to and receiving responses from AMF 115.

A User Plane Function (UPF) 128 may support voice and data bearers for UE 105 and may enable UE 105 voice and data access to other networks such as the Internet 175. UPF 128 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 128 may be connected to a Secure User Plane Location (SUPL) Location Platform (SLP) 129 to enable support of positioning of UE 105 using SUPL. SLP 129 may be further connected to or accessible from external client 130.

As illustrated, a Session Management Function (SMF) 126 connects the AMF 115 and the UPF 128. The SMF 126 may have the capability to control both a local and a central UPF within a PDU session. SMF 126 may manage the establishment, modification and release of PDU sessions for UE 105, perform IP address allocation and management for UE 105, act as a Dynamic Host Configuration Protocol (DHCP) server for UE 105, and select and control a UPF 128 on behalf of UE 105.

The external client 130 may be connected to the core network 140 via the GMLC 125 and/or the SLP 129. The external client 130 may optionally be connected to the core network 140 and/or to a location server 120A, which may be, e.g., an SLP, that is external to 5GCN 140, via the Internet 175. The external client 130 may be a server, a web server, or a user device, such as a personal computer, a UE, etc.

As further illustrated in FIG. 1, the LMF 120 may communicate with the gNBs 110 and/or with the ng-eNB 114 using a New Radio Position Protocol A (NRPPa), which may be defined in 3GPP Technical Specification (TS) 38.455. NRPPa messages may be transferred between a gNB 110 and the LMF 120, and/or between an ng-eNB 114 and the LMF 120, via the AMF 115. As further illustrated in FIG. 1, LMF 120 and UE 105 may communicate using an LTE Positioning Protocol (LPP), which may be defined in 3GPP TS 36.355 or TS 37.355. LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using service operations based on the HyperText Transfer Protocol (HTTP) and may be transferred between the AMF 115 and the UE 105 using a 5G Non-Access Stratum (NAS) protocol. The LPP and/or NPP protocol may be used to support positioning of UE 105 using UE assisted and/or UE based position methods such as A-GNSS, RTK, OTDOA, AoA, AOD, and/or ECID. The NRPPa protocol may be used to support positioning of UE 105 using network based position methods such as ECID (e.g. when used with measurements obtained by a gNB 110 or ng-eNB 114) and/or may be used by LMF 120 to obtain location related information from gNBs 110 and/or ng-eNB 114, such as parameters defining Positioning Reference Signal (PRS) transmission from gNBs 110 and/or ng-eNB 114.

With a UE assisted position method, UE 105 may obtain location measurements and send the measurements to a location server (e.g. LMF 120 or SLP 129) for computation of a location estimate for UE 105. For example, the location measurements may include one or more of a Received Signal Strength Indication (RSSI), Round Trip signal propagation Time (which may also be referred to more simply as Round Trip Time (RTT)), Reference Signal Time Difference (RSTD), Reference Signal Received Power (RSRP), Reference Signal Received Quality (RSRQ), Receive Time-Transmission Time difference (RxTx) (also referred to as "UE Rx-Tx time difference" as defined in 3GPP TS 38.215), AOA, and/or AOD for gNBs 110, ng-eNB 114 and/or a WLAN access point (AP). The location measurements may also or instead include measurements of GNSS pseudorange, code phase and/or carrier phase for SVs 190.

With a UE based position method, UE 105 may obtain location measurements (e.g. which may be the same as or similar to location measurements for a UE assisted position method) and may compute a location of UE 105 (e.g. with the help of assistance data received from a location server such as LMF 120 or broadcast by gNBs 110, ng-eNB 114 or other base stations or APs).

With a network based position method, one or more base stations (e.g. gNBs 110 and/or ng-eNB 114) or APs may obtain location measurements (e.g. measurements of RSSI, RTT, RSRP, RSRQ, RxTx, AOA or Time Of Arrival (TOA)) for signals transmitted by UE 105, and/or may receive measurements obtained by UE 105, and may send the measurements to a location server (e.g. LMF 120) for computation of a location estimate for UE 105. In some position methods like multi-RTT or with hybrid positioning, measurements (e.g. RxTx, RSRP and/or AOA) may be obtained by both a UE 105 and gNBs 110, with gNB 110 measurements then being sent to the UE 105 to perform UE based positioning or with all measurements being sent to an LMF 120 to perform UE assisted positioning.

Information provided by the gNBs 110 and/or ng-eNB 114 to the location server, e.g., LMF 120 using NRPPa or to an LMC within the NG-RAN 135, such as in serving gNB 110-1 using XnAP, may include timing and configuration information for PRS transmission and location coordinates. The location server may then provide some or all of this information to the UE 105 as assistance data in an LPP and/or NPP message via the NG-RAN 135 and the 5GC 140.

An LPP or NPP message sent from the location server to the UE 105 may instruct the UE 105 to do any of a variety of things, depending on desired functionality. For example, the LPP or NPP message could contain an instruction for the UE 105 to obtain measurements for GNSS (or A-GNSS). WLAN, multi-RTT, and/or OTDOA (or some other position method). In the case of OTDOA, the LPP or NPP message may instruct the UE 105 to obtain one or more measurements (e.g. RSTD measurements) of PRS signals transmitted within particular cells supported by particular gNBs 110 and/or ng-eNB 114 (or supported by some other type of base station such as an eNB or WiFi AP). An RSTD measurement may comprise the difference in the times of arrival at the UE 105 of a signal (e.g. a PRS signal) transmitted or broadcast by one gNB 110 and a similar signal transmitted by another gNB 110. The UE 105 may send the measurements back to the location server, e.g., to the LMF 120 in an LPP or NPP message (e.g. inside a 5G NAS message) via the serving gNB 110-1 (or serving ng-eNB 114) and the AMF 115 or to the LMC within a node in the NG-RAN 135, such as in the serving gNB 110-1.

As noted, while the communication system 100 is described in relation to 5G technology, the communication system 100 may be implemented to support other communication technologies, such as GSM, WCDMA. LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN, either directly or using a Non-3GPP InterWorking Function (N3IWF, not shown FIG. 1) in the 5GC 140. For example, the WLAN may support IEEE 802.11 WiFi access for UE 105 and may comprise one or more WiFi APs. Here, the N3IWF may connect to the WLAN and to other elements in the 5GC 140 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPA (LPPa, as defined in 3GPP TS 36.455) in place of NRPPa to send and receive location information to and from the eNBs in the E-UTRAN and may use LPP to support positioning of UE 105. In these other embodiments, support for BWPs for positioning of a UE 105 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

To support certain position methods such as OTDOA and transmission of PRS or other signals used in positioning of a UE 105, base stations may be synchronized. In a synchronized network, the transmission timing of gNBs 110 may be synchronized such that each gNB 110 has the same transmission timing as every other gNB 110 to a high level of precision—e.g. 50 nanoseconds or less. Alternatively, the gNBs 110 may be synchronized at a radio frame or subframe level such that each gNB 110 transmits a radio frame or subframe during the same time duration as every other gNB 110 (e.g. such that each gNB 110 starts and finishes transmitting a radio frame or subframe at almost precisely the same times as every other gNB 110), but does not necessarily maintain the same counters or numbering for radio frames or subframes. For example, when one gNB 110 is transmitting a subframe or radio frame with counter or number zero (which may be the first radio frame or subframe in some periodically repeated sequence of radio frames or subframes), another gNB 110 may be transmitting a radio frame or subframe with a different number or counter such as one, ten, one hundred etc.

Synchronization of the transmission timing of ng-eNBs 114 in NG-RAN 135 may be supported in a similar manner to synchronization of gNBs 110, although since ng-eNBs 114 may typically use a different frequency to gNBs 110 (to avoid interference), an ng-eNB 114 may not always be synchronized to gNBs 110. Synchronization of gNBs 110 and ng-eNBs 114 may be achieved using a GPS receiver or a GNSS receiver in each gNB 110 and ng-eNB 114 or by other means such as using the IEEE 1588 Precision Time Protocol.

Figure 2:
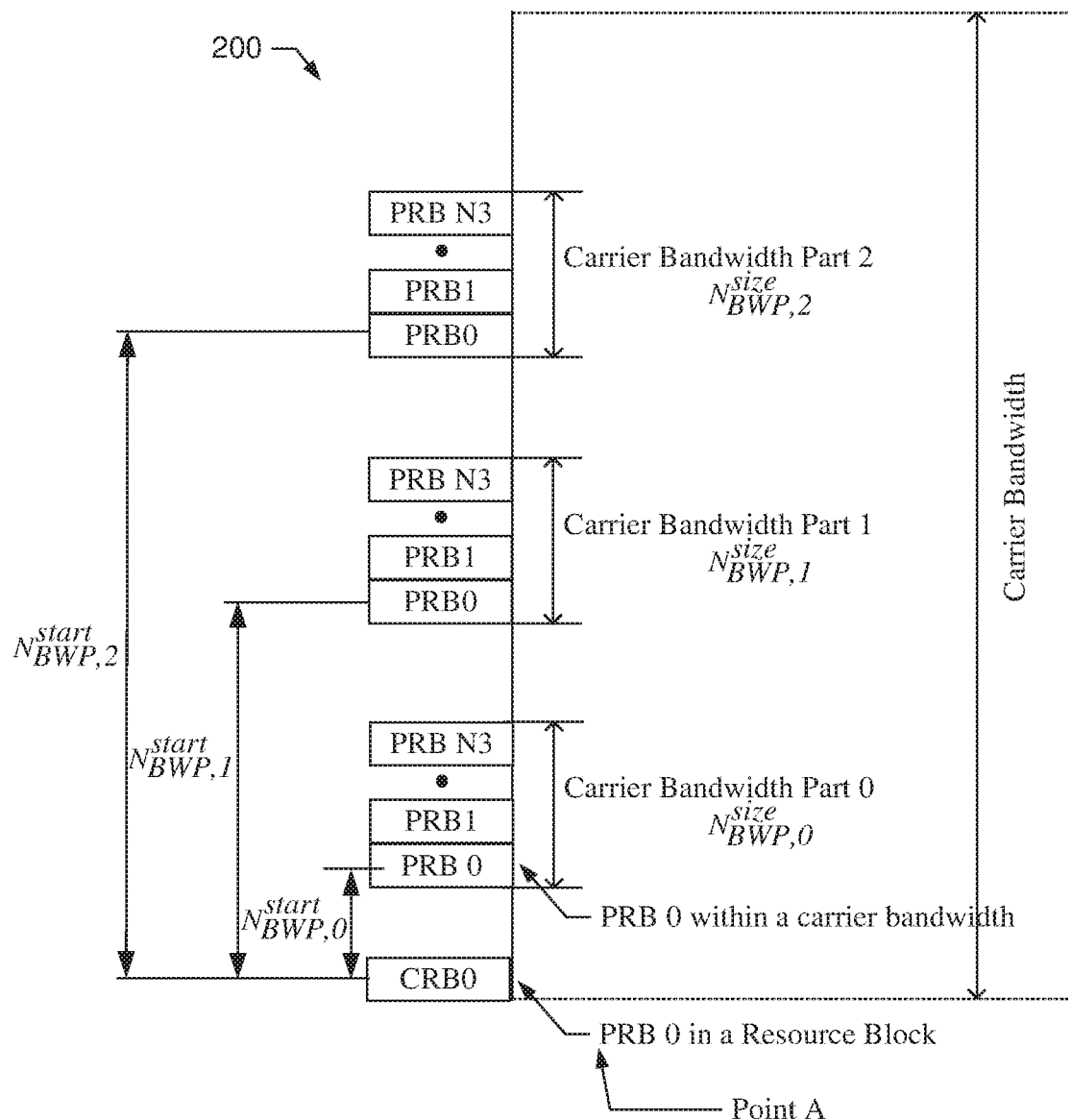
FIG. 2 illustrates the use of multiple Bandwidth Parts as specific subsets of frequencies within the total carrier bandwidth.

FIG. 2 illustrates multiple BWPs as specific subsets of frequencies within a total carrier bandwidth 200. A BWP is a contiguous set of physical resource blocks, selected from a contiguous subset of the common resource blocks for a given numerology (u) on a given carrier. A maximum of four BWPs may be specified in DL and UL, although FIG. 2 illustrates the use of three BWPs. In FIG. 2, the Carrier Resource Block (CRB) is numbered from tone end through to the other end of Carrier Band, as a global resource block, while the Physical Resource Block (PRB) is the resource blocks numbered within each BWP. The various BWPs may be spread across the entire carrier band. Moreover, the BWPs may be overlapping or non-overlapping amongst themselves. While up to four BWPs may be configured, only one may be active for any UE at a given time. The UE 105 does not receive or transmit outside the active BWP.

Figure 3:
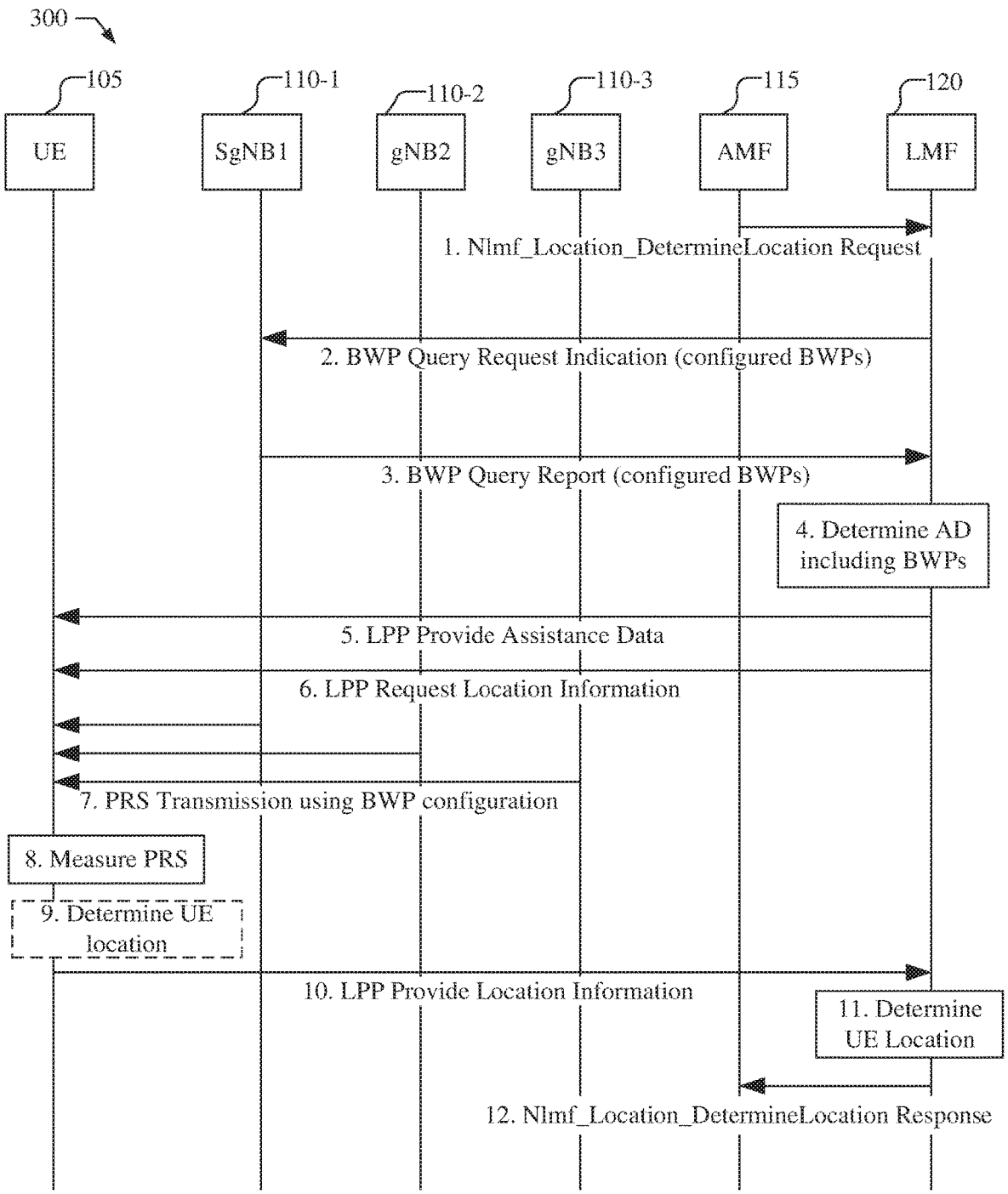
FIG. 3 is a signaling flow showing messages sent between components of a communication network with a Location Management Function (LMF) control of BWP based on BWP information provided by a serving base station.

FIG. 3 shows a signaling flow 300 that illustrates various messages sent between components of the communication system 100 depicted in FIG. 1, during a positioning session (also referred to as a location session or a session) between the UE 105 and the LMF 120. While the flow diagram is discussed, for ease of illustration, in relation to a 5G NR wireless access using gNBs 110, signaling flows similar to FIG. 3 involving ng-eNBs 114 or eNBs rather than gNBs 110 will be readily apparent to those with ordinary skill in the art. Furthermore, in some embodiments, the UE 105 itself may be configured to determine its location using, for example, assistance data provided to it. In the signaling flow 300, it is assumed that the UE 105 and LMF 120 communicate using the LPP positioning protocol referred to earlier, although use of NPP or a combination of LPP and NPP is also possible.

FIG. 3 illustrates a procedure for LMF query of the gNBs 110 for the configured BWPs and/or the active BWP for the UE 105 and use of this BWP information during the positioning session. Every gNB 110 may configure up to 4 BWPs and may assign one of the configured BWPs to UE 105 as the active BWP. The LMF 120 may query the serving gNB 110-1 for the active BPW for UE 105 and/or a list of configured BWPs, which the LMF 120 may then use to prepare assistance data for the UE 105.

At stage 1 in FIG. 3, the serving AMF 115 for a UE 105 invokes an Nlmf_Location_DetermineLocation service operation towards the LMF 120 to request the current location of the UE 105. The service operation includes the serving cell identity, the LCS client type and may include a required QoS. For example, AMF 115 may perform stage 1 in response to receiving a location request for UE 105 from GMLC 125.

At stage 2, the LMF 120 sends an NRPPa message with a BWP Query Request Indication to the serving gNB 110-1. The BWP Query Request Indication requests the active BPW for UE 105 and/or a list of configured BWPs. The LMF 120 may specify the estimated positioning session time to the gNB 110-1.

At stage 3, the serving gNB 110-1 returns an NRPPa message to the LMF 120 with a BWP Query Report. The BWP Query Report may include the active BWP for the UE 105 and/or a list of configured BWPs. If the LMF 120 provided the estimated positioning session time in stage 2, the serving gNB 110-1 may provide a reduced list of BWPs that are expected to be active during the session time. The serving gNB 110-1 may respond with the BWP details for DL as well as BWP details for UL (for paired spectrum). The serving gNB 110-1 may also indicate the BWP switching pattern used by the serving gNB 110-1 if known, e.g., based on the gNB scheduler algorithm. If the serving gNB 110-1 is not able to provide BWP information in response to the BWP Query Request Indication message from stage 2, the gNB 110-1 may respond with an NRPPa message to the LMF 120 that includes a BWP Query Request Failure, instead of the BWP Query Report.

At stage 4, the LMF 120 determines assistance data (AD) using the BWP information obtained at stage 3. By way of example, assistance data may be generated or identified based on the BWP information or assistance data may be filtered based on the BWP information. For example, the LMF 120 may generate or identify AD based on the active BWP or the list of configured BWPs that will be active during the positioning session time, or both. The LMF 120 may include information in the AD for positioning reference signals transmitted by the serving gNB 110-1 and neighbor gNBs 110 in the wireless network that are intra-frequency with respect to the active BWP, the list of configured BWPs that will be active during the positioning session time, or both. The LMF 120 may filter assistance data based on the BWP information. For example, the LMF 120 may re-order a gNB list in the AD based on the BWP switching pattern received from the serving gNB 110-1, so that after a BWP switch, the gNBs are intra-frequency with respect to the new BWP so that the UE 105 will be able to continue to measure DL signals from these gNBs. Thus, the assistance data may include information for positioning reference signals transmitted by the serving gNB 110-1 and neighbor gNBs 110 in the wireless network that are intra-frequency with respect to a new BWP, wherein the BWP switching pattern indicates a switch of the UE by the serving gNB to the new BWP.

At stage 5, the LMF 120 sends an LPP Provide Assistance Data message to the UE 105 to provide the AD determined at stage 4. For example, the LPP Provide Assistance Data message may be forwarded to the UE 105 by the AMF 115 and the serving gNB 110-1.

At stage 6, the LMF 120 sends an LPP Request Location Information message to the UE 105 to request the UE 105 to measure DL PRS transmission by the gNBs 110. For example, the LMF 120 may request measurements of RSTD if OTDOA is used, TOA or RxTx measurements if multi-RTT is used, or AOA or AOD measurements if AOA or AOD are used. The LMF 120 may also indicate whether UE based positioning is requested whereby the UE 105 determines its own location. In some implementations, the LMF 120 may also include in the LPP Request Location Information message a request for location measurements for other position methods which do not use PRS (e.g. WiFi positioning or A-GNSS positioning).

At stage 7, each of the gNBs 110 transmits PRS signals, which may be using the active BWP.

At stage 8, the UE 105 acquires and measures the DL PRS transmitted using the active BWP by the gNBs 110 at stage 7. For example, the UE 105 may obtain RSTD measurements when OTDOA is used. TOA or RxTx measurements when RTT is used, or AOA or AOD measurements when AOA or AOD is used. The UE 105 may also obtain other non-PRS measurements in addition if requested at stage 6.

At stage 9, if UE 105 based positioning was requested at stage 6, the UE 105 determines its location based on the PRS measurements (and any other measurements) obtained at stage 8 and the assistance data received at stage 5.

At stage 10, the UE 105 sends an LPP Provide Location Information message to the LMF 120 and includes the PRS measurements (and any other measurements) obtained at stage 8 or the UE location obtained at stage 9. For example, the LPP Provide Location Information message may be forwarded to the LMF 120 by the serving gNB 110-1 and AMF 115.

At stage 11, the LMF 120 determines the UE location based on any PRS measurements (and any other measurements) received at stage 10 or may verify a UE location received at stage 10.

For some positioning methods (e.g. multi-RTT), LMF 120 may also request UE 105 (e.g. as part of stage 5 or stage 6) to transmit an uplink (UL) PRS or UL Sounding Reference Signal (SRS) and may request one or more gNBs 110 to obtain UL measurements (e.g. RxTx, AOA, TOA and/or RSRP) of the UL PRS or UL SRS. The UL measurements may then be sent by the gNBs 110 to LMF 120 to assist LMF 120 to obtain a location of UE 105 at stage 11 using both the UL measurements and the PRS measurements provided by UE 105 at stage 10.

At stage 12, the LMF 120 returns an Nlmf_Location_DetermineLocation Response to the AMF 115 to return the location obtained at stage 11.

Figure 4:
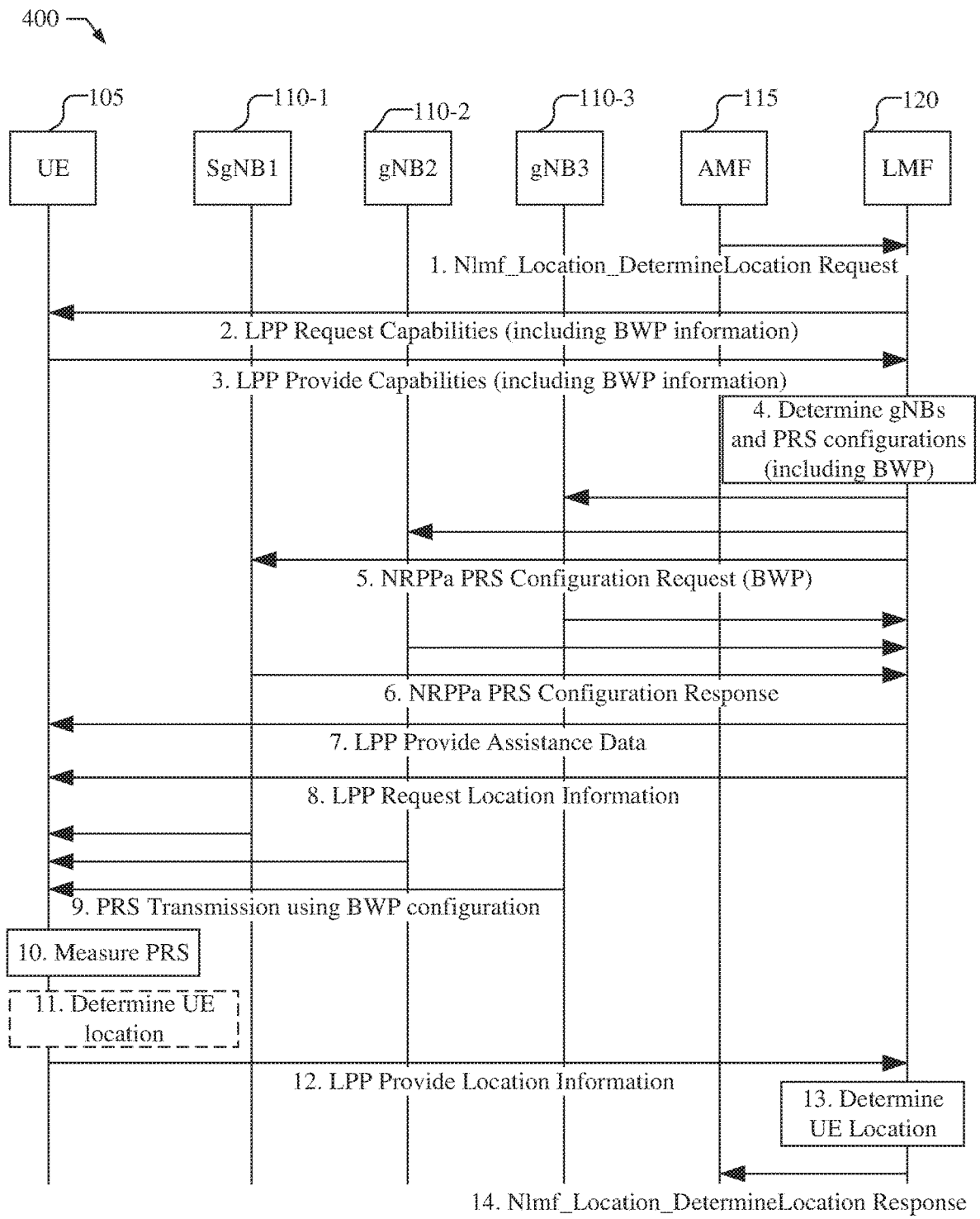
FIG. 4 is a signaling flow showing messages sent between components of a communication network with a LMF control of BWP based on BWP information provided by a user equipment (UE).

FIG. 4 shows a signaling flow 400 that illustrates various messages sent between components of the communication system 100 depicted in FIG. 1, during a location session between the UE 105 and the LMF 120. While the flow diagram is discussed, for ease of illustration, in relation to a 5G NR wireless access using gNBs 110, signaling flows similar to FIG. 3 involving ng-eNBs 114 or eNBs rather than gNBs 110 will be readily apparent to those with ordinary skill in the art. Furthermore, in some embodiments, the UE 105 itself may be configured to determine its location using, for example, assistance data provided to it. In the signaling flow 400, it is assumed that the UE 105 and LMF 120 communicate using the LPP positioning protocol referred to earlier, although use of NPP or a combination of LPP and NPP is also possible.

FIG. 4 illustrates a procedure in which the UE 105 itself may report the active BWP and/or configured BWPs to the location server, e.g., LMF 120, which may adapt the assistance data accordingly.

At stage 1 in FIG. 4, the serving AMF 115 for a UE 105 invokes an Nlmf_Location_DetermineLocation service operation towards the LMF 120 to request the current location of the UE 105. The service operation includes the serving cell identity, the LCS client type and may include a required Quality of Service (QoS). For example, AMF 115 may perform stage 1 in response to receiving a location request for UE 105 from GMLC 125.

At stage 2, the LMF 120 sends an LPP Request Capabilities message to the UE 105 to request the positioning capabilities of the UE 105. The Request Capabilities message to the UE 105 includes a request for BWP information from the UE 105. In one implementation, the request for BWP information may request an ordered list of BWPs based on preference.

At stage 3, the UE 105 returns an LPP Provide Capabilities message to the LMF 120 to provide the positioning capabilities of the UE 105. The positioning capabilities include the DL PRS measurement capabilities of the UE 105. The UE 105 may include the requested BWP information in the LPP Provide Capabilities message. For example, the UE 105 may include the active BWP and/or the configured BWPs for the serving gNB 110-1 if known to UE 105. In one implementation, the UE 105 may provide an ordered list of BWPs in the order of preference for PRS transmission. The ordered list of BWPs may be based on past usage of BWPs by the serving gNB 110-1. For example, a BWP that is most frequently used by the serving gNB 110-1 for the UE 105 may be ranked higher in the ordered list of BWPs.

At stage 4, the LMF 120 determines assistance data (AD) and PRS configurations using the BWP information obtained at stage 3. By way of example, assistance data may be generated or identified based on the BWP information or assistance data may be filtered based on the BWP information. For example, the LMF 120 may generate or identify AD based on the active BWP or the list of configured BWPs that will be active during the positioning session time, or both. The LMF 120 may include information in the AD for positioning reference signals transmitted by the serving gNB 110-1 and neighbor gNBs 110 in the wireless network that are intra-frequency with respect to the active BWP, the list of configured BWPs that will be active during the positioning session time, or both. The LMF may filter assistance data based on the BWP information. For example, the LMF 120 may re-order a gNB list in the AD based on the BWP switching pattern received from the serving gNB 110-1, so that after a BWP switch, the gNBs are intra-frequency with respect to the new BWP so that the UE 105 will be able to continue to measure DL signals from these gNBs. The LMF 120 may include information in the AD for positioning reference signals transmitted by the serving gNB and neighbor gNB s in the wireless network that are intra-frequency with respect to the active BWP, the list of configured BWPs or both. The LMF 120 may order a neighbor gNB list in the AD based on the ordered list of BWPs received from the UE 105.

At stage 5, the LMF 120 optionally sends an NRPPa PRS Configuration Request message to each of the gNBs 110 determined at stage 4 that includes the BWP determined for the PRS to be sent by that gNB 110.

At step 6, if stage 5 occurs, each of the gNBs 110 returns a response to the LMF 120 indicating whether the PRS configuration with the indicated BWP can be supported. If some gNBs 110 indicate that the PRS configuration with the indicated BWP cannot be supported, the LMF 120 may perform stage 4 a second time to determine appropriate AD and PRS configurations.

At stage 7, the LMF 120 sends an LPP Provide Assistance Data message to the UE 105 to provide the AD determined at stage 4. For example, the LPP Provide Assistances Data message may be forwarded to the UE 105 by the serving gNB 110-1 and AMF 115.

At stage 8, the LMF 120 sends an LPP Request Location Information message to the UE 105 to request the UE 105 to measure DL PRS transmission by the gNBs 110. For example, the LMF 120 may request measurements of RSTD if OTDOA is used, TOA or RxTx measurements if multi-RTT is used, or AOA or AOD measurements if AOA or AOD are used. The LMF 120 may also indicate whether UE based positioning is requested whereby the UE 105 determines its own location. In some implementations, the LMF 120 may also include in the LPP Request Location Information message a request for location measurements for other position methods which do not use PRS (e.g. WiFi positioning or A-GNSS positioning).

At stage 9, each of the gNBs 110 transmits PRS signals using the BWP as indicated at stage 5 if stage 5 is performed or as previously configured in the gNBs 110 when stage 5 is not performed.

At stage 10, the UE 105 acquires and measures the DL PRS transmitted using the active BWP by the gNBs 110 at stage 9. For example, the UE 105 may obtain RSTD measurements when OTDOA is used, TOA or RxTx measurements when multi-RTT is used, or AOA or AOD measurements when AOA or AOD is used. The UE 105 may also obtain other non-PRS measurements in addition if requested at stage 8.

At stage 11, if UE 105 based positioning was requested at stage 8, the UE 105 determines its location based on the PRS measurements (and any other measurements) obtained at stage 10 and the assistance data received at stage 7.

At stage 12, the UE 105 sends an LPP Provide Location Information message to the LMF 120 and includes the PRS measurements (and any other measurements) obtained at stage 10 or the UE location obtained at stage 11. For example, the LPP Provide Location Information message may be forwarded to the LMF 120 by the serving gNB 110-1.

At stage 13, the LMF 120 determines the UE location based on any PRS measurements (and any other measurements) received at stage 12 or may verify a UE location received at stage 12.

For some positioning methods (e.g. multi-RTT). LMF 120 may also request UE 105 (e.g. as part of stage 7 or stage 8) to transmit an uplink (UL) PRS or UL Sounding Reference Signal (SRS) and may request one or more gNBs 110 to obtain UL measurements (e.g. RxTx, AOA, TOA and/or RSRP) of the UL PRS or UL SRS. The UL measurements may then be sent by the gNBs 110 to LMF 120 to assist LMF 120 to obtain a location of UE 105 at stage 13 using both the UL measurements and the PRS measurements provided by UE 105 at stage 12.

At stage 14, the LMF 120 returns an Nlmf_Location_DetermineLocation Response to the AMF 115 to return the location obtained at stage 13.

Figure 5:
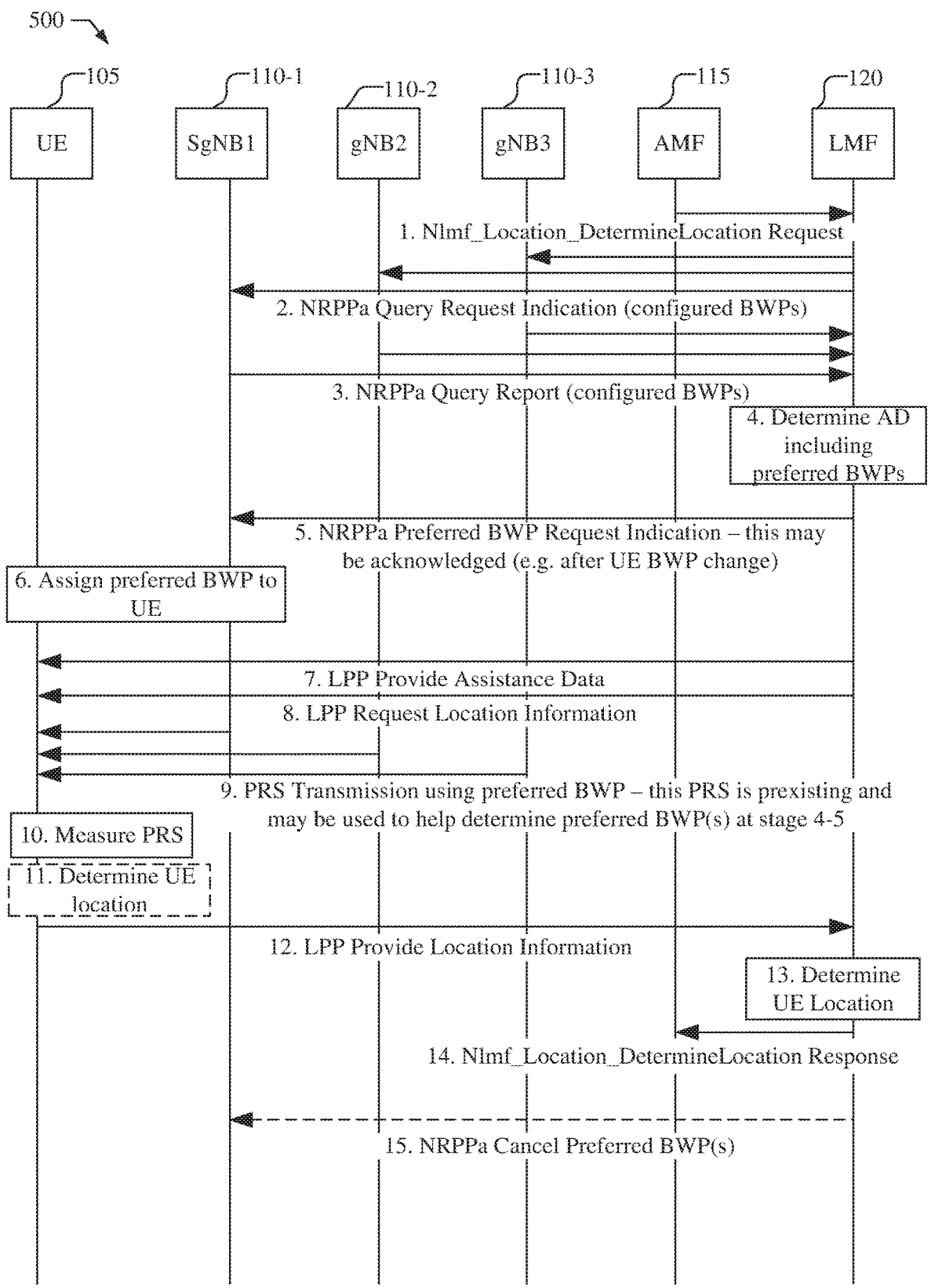
FIG. 5 is a signaling flow showing messages sent between components of a communication network with a LMF control of BWP using a preferred BWP.

FIG. 5 shows a signaling flow 500 that illustrates various messages sent between components of the communication system 100 depicted in FIG. 1, during a location session between the UE 105 and the LMF 120. While the flow diagram is discussed, for ease of illustration, in relation to a 5G NR wireless access using gNBs 110, signaling flows similar to FIG. 5 involving ng-eNBs 114 or eNBs rather than gNBs 110 will be readily apparent to those with ordinary skill in the art. Furthermore, in some embodiments, the UE 105 itself may be configured to determine its location using, for example, assistance data provided to it. In the signaling flow 500, it is assumed that the UE 105 and LMF 120 communicate using the LPP positioning protocol referred to earlier, although use of NPP or a combination of LPP and NPP is also possible.

FIG. 5 illustrates a procedure that is similar to the procedure illustrated in FIG. 3, in which the location server, e.g., LMF 120 receives the active and/or configured BWPs for the UE 105 and adapts the assistance data accordingly so as to include intra-frequency gNBs based on the active BWP, the configured BWPs, and the pattern of BWP switch, if available. In signaling flow 500, the LMF 120 may determine that good AD, e.g., with a good gNB 110 geometry relative to the location of UE 105, cannot be generated based on the BWPs activated and/or configured for the UE 105, and accordingly, specifies a preferred BWP to be used by the serving gNB 110-1 for the UE 105 during the positioning session.

At stage 1 in FIG. 5, the serving AMF 115 for the UE 105 invokes an Nlmf_Location_DetermineLocation service operation towards the LMF 120 to request the current location of the UE 105. The service operation includes the serving cell identity, the LCS client type and may include a required QoS. For example, AMF 115 may perform stage 1 in response to receiving a location request for UE 105 from GMLC 125.

At stage 2, the LMF 120 sends an NRPPa message with a BWP Query Request Indication to the serving gNB 110-1 and optionally each of the neighbor gNBs 110-2, 110-3. The BWP Query Request Indication requests the active BPW from the serving gNB 110-1 and a list of configured BWPs from other gNBs 110 and possibly the serving gNB 110-1. The LMF 120 may specify the estimated session time to the serving gNB 110-1.

At stage 3, each of the gNBs 110 returns an NRPPa message to the LMF 120 with a BWP Query Report. The BWP Query Report may include the active BWP for the UE 105 in the case of gNB 110-1 and a list of configured BWPs in the case of other gNBs 110 and possibly the serving gNB 110-1, as well as the BWP used for PRS signals and a list of configured BWPs for PRS signals from each gNB 110. If the LMF 120 provided the estimated session time in stage 2, the serving gNB 110-1 may provide a reduced list of BWPs that are intended to be active during the session time. The gNBs 110 may respond with the BWP details for DL as well BWP details for UL (for paired spectrum). The serving gNB 110-1 may also indicate the BWP switching pattern used by the gNB 110-1, e.g., based on the gNB scheduler algorithm. If a gNB 110 is not able to provide BWP information in response to the BWP Query Request Indication message from stage 2, the gNB 110 may respond with an NRPPa message to the LMF 120 that includes a BWP Query Request Failure, instead of the BWP Query Report.

At stage 4, the LMF 120 determines assistance data (AD) using the BWP information obtained at stage 3. By way of example, assistance data may be generated or identified based on the BWP information or assistance data may be filtered based on the BWP information. For example, the LMF 120 may identify or generate AD based on the active BWP or the list of configured BWPs for the serving gNB 110-1 that will be active during the positioning session time, or both. The LMF 120 may include information in the AD for positioning reference signals transmitted by the serving gNB 110-1 and neighbor gNBs 110 in the wireless network that are intra-frequency with respect to the active BWP, the list of configured BWPs that will be active during the positioning session time, or both. The LMF 120 may re-order a neighbor gNB list in the AD based on the BWP switching pattern received from the serving gNB 110-1, so that after a BWP switch, the gNBs are intra-frequency with respect to the new BWP so that the UE 105 will be able to continue to measure DL signals from these gNBs. Thus, the assistance data may include information for positioning reference signals transmitted by the serving gNB 110-1 and neighbor gNBs 110 in the wireless network that are intra-frequency with respect to a new BWP, wherein the BWP switching pattern indicates a switch of the UE by the serving gNB to the new BWP. Depending on the availability of positioning signals from the gNBs 110, which may be, dedicated PRS, SSBs, PTRS, the LMF 120 may determine that it is not possible to generate AD with good gNB 110 geometry based on the active BWP or configured BPWs from the serving gNB 110-1. The LMF 120 may determine a preferred BWP to be used by the serving gNB 110-1 for the UE 105 during the positioning session based on the BWP information received from the neighbor gNBs 110-2 and 110-3. For example, the serving gNB 110-1 may be prohibited from switching BWP during the positioning session until all the neighbor measurements are done, after which the serving gNB 110-1 may fall back to its default switching behavior with its BWP switching pattern. The preferred BWP may be either a singleton or a list, e.g., a subset of the configured BWPs, to be used by the serving gNB 110-1 with which the LMF 120 may construct good AD, e.g., with good geometry, with infra-frequency neighbor gNBs 110-2 and 110-3.

At stage 5, the LMF 120 sends an NRPPa message including a Preferred BWP Request Indication to the serving gNB 110-1 that includes the preferred BWP determined at stage 4 and optionally an expected duration of the positioning session. The Preferred BWP Request Indication may be acknowledged, e.g., after the preferred BWP is changed with the UE 105 at stage 6. In another implementation, the Preferred BWP Request Indication is not acknowledged, but a Preferred BWP Request Failure message may be returned by the serving gNB 110-1 if the preferred BWP cannot be used, e.g., if the preferred BWP cannot be assigned to the UE 105 at stage 6.

At stage 6, the serving gNB 110-1 assigns the preferred BWP to the UE 105 and may ensure the preferred BWP is not changed for the expected duration of the position session if this was included at stage 5.

At stage 7, the LMF 120 sends an LPP Provide Assistance Data message to the UE 105 to provide the AD determined at stage 4. For example, the LPP Provide Assistances Data message may be forwarded to the UE 105 by the serving gNB 110-1.

At stage 8, the LMF 120 sends an LPP Request Location Information message to the UE 105 to request the UE 105 to measure DL PRS transmission by the gNBs 110. For example, the LMF 120 may request measurements of RSTD if OTDOA is used, TOA or RxTx measurements if multi-RTT is used, or AOA or AOD measurements if AOA or AOD are used. The LMF 120 may also indicate whether UE based positioning is requested whereby the UE 105 determines its own location. In some implementations, the LMF 120 may also include in the LPP Request Location Information message a request for location measurements for other position methods which do not use PRS (e.g. WiFi positioning or A-GNSS positioning).

At stage 9, each of the gNBs 110 transmits PRS signals using the preferred BWP. The PRS may be preexisting and may be used to help determine the preferred BWP(s) at stage 4 and 5, as discussed above.

At stage 10, the UE 105 acquires and measures the DL PRS transmitted using the preferred BWP by the gNBs 110 at stage 9. For example, the UE 105 may obtain RSTD measurements when OTDOA is used, TOA or RxTx measurements when multi-RTT is used, or AOA or AOD measurements when AOA or AOD is used. The UE 105 may also obtain other non-PRS measurements in addition if requested at stage 8.

At stage 11, if UE 105 based positioning was requested at stage 8, the UE 105 determines its location based on the PRS measurements (and any other measurements) obtained at stage 10 and the assistance data received at stage 7.

At stage 12, the UE 105 sends an LPP Provide Location Information message to the LMF 120 and includes the PRS measurements (and any other measurements) obtained at stage 10 or the UE location obtained at stage 11. For example, the LPP Provide Location Information message may be forwarded to the LMF 120 by the serving gNB 110-1.

At stage 13, the LMF 120 determines the UE location based on any PRS measurements (and any other measurements) received at stage 12 or may verify a UE location received at stage 12.

For some positioning methods (e.g. multi-RTT), LMF 120 may also request UE 105 (e.g. as part of stage 7 or stage 8) to transmit an uplink (UL) PRS or UL Sounding Reference Signal (SRS) and may request one or more gNBs 110 to obtain UL measurements (e.g. RxTx, AOA, TOA and/or RSRP) of the UL PRS or UL SRS. The UL measurements may then be sent by the gNBs 110 to LMF 120 to assist LMF 120 to obtain a location of UE 105 at stage 13 using both the UL measurements and the PRS measurements provided by UE 105 at stage 12.

At stage 14, the LMF 120 returns an Nlmf_Location_DetermineLocation Response to the AMF 115 to return the location obtained at stage 13.

At stage 15, the LMF 120 may send an NRPPa message including a Cancel Preferred BWP to the serving gNB 110-1 in order to cancel the use of the preferred BWP. If a session time for the preferred BWP(s) was provided to the gNBs 110 at stage 5, stage 15 may be unnecessary.

Figure 6:
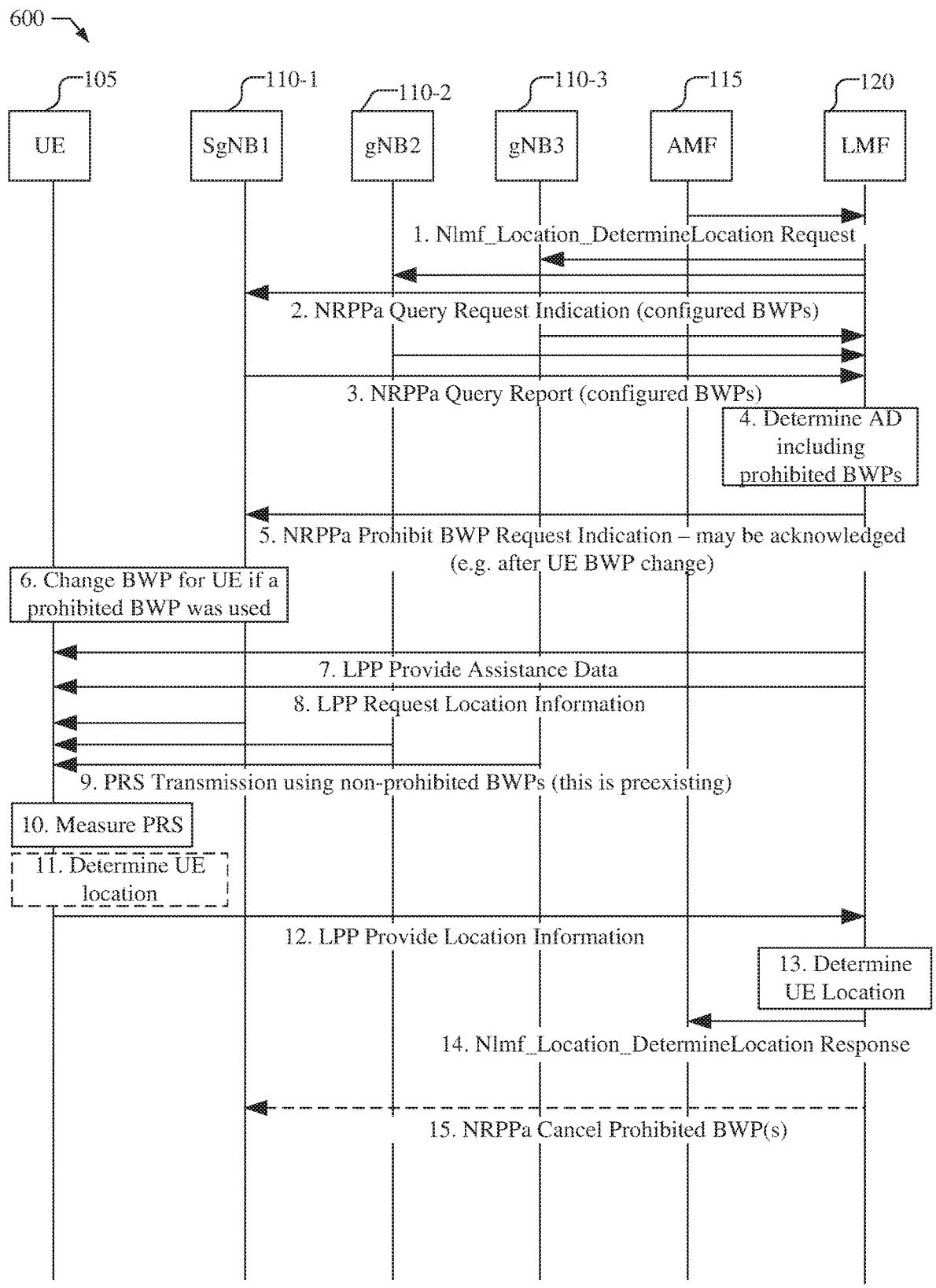
FIG. 6 is a signaling flow showing messages sent between components of a communication network with a LMF control of BWP using prohibited BWPs.

FIG. 6 shows a signaling flow 600 that illustrates various messages sent between components of the communication system 100 depicted in FIG. 1, during a location session between the UE 105 and the LMF 120. While the flow diagram is discussed, for ease of illustration, in relation to a 5G NR wireless access using gNBs 110, signaling flows similar to FIG. 5 involving ng-eNBs 114 or eNBs rather than gNBs 110 will be readily apparent to those with ordinary skill in the art. Furthermore, in some embodiments, the UE 105 itself may be configured to determine its location using, for example, assistance data provided to it. In the signaling flow 600, it is assumed that the UE 105 and LMF 120 communicate using the LPP positioning protocol referred to earlier, although use of NPP or a combination of LPP and NPP is also possible.

FIG. 6 illustrates a procedure that is similar to the procedure illustrated in FIG. 3, in which the location server, e.g., LMF 120 receives the active and configured BWPs for the UE 105 and adapts the assistance data accordingly so as to include intra-frequency gNBs based on the active BWP, the configured BWPs, and the pattern of BWP switch, if available. In signaling flow 600, the LMF 120 may determine that there are BWPs for which there is not good AD, e.g., with good geometry, or that the BWPs may produce interference that will affect measurements and lead to a poor position fix, and accordingly, the LMF 120 may prohibit BWPs from being used during the positioning session with the UE 105.

At stage 1 in FIG. 6, the serving AMF 115 for a UE 105 invokes an Nlmf_Location_DetermineLocation service operation towards the LMF 120 to request the current location of the UE 105. The service operation includes the serving cell identity, the LCS client type and may include a required QoS. For example, AMF 115 may perform stage 1 in response to receiving a location request for UE 105 from GMLC 125.

At stage 2, the LMF 120 sends an NRPPa message with a BWP Query Request Indication to the serving gNB 110-1 and optionally each of the neighbor gNBs 110-2. The BWP Query Request Indication requests the active BPW and a list of configured BWPs. The LMF 120 may specify the estimated session time to the gNBs 110.

At stage 3, each of the gNBs 110 returns an NRPPa message to the LMF 120 with a BWP Query Report. The BWP Query Report may include the active BWP for the UE 105 in the case of the serving gNB 110-1 and a list of configured BWPs from other gNBs 110 and optionally the serving gNB 110-1, as well as the BWP used for PRS signals and a list of configured BWPs for PRS signals from all gNBs 110. If the LMF 120 provided the estimated session time in stage 2, the serving gNB 110-1 may provide a reduced list of BWPs that are intended to be active during the session time. The serving gNB 110-1 may identify BWPs used for transmission and reception. The serving gNB 110-1 may also identify the BWP switching pattern used by the gNB, e.g., based on the gNB scheduler algorithm. If a gNB is not able to provide BWP information in response to the BWP Query Request Indication message from stage 2, the gNB may respond with an NRPPa message to the LMF 120 that includes a BWP Query Request Failure, instead of the BWP Query Report.

At stage 4, the LMF 120 determines assistance data (AD) using the BWP information obtained at stage 3. By way of example, assistance data may be generated or identified based on the BWP information or assistance data may be filtered based on the BWP information. For example, the LMF 120 may generate or identify AD based on the active BWP or the list of configured BWPs that will be active during the positioning session time, or both. The LMF 120 may include information in the AD for positioning reference signals transmitted by the serving gNB 110-1 and neighbor gNBs 110 in the wireless network that are intra-frequency with respect to the active BWP, the list of configured BWPs that will be active during the positioning session time, or both. The LMF 120 may filter assistance data based on the BWP information. For example, the LMF 120 may re-order a neighbor gNB list in the AD based on the BWP switching pattern received from the serving gNB 110-1, so that after a BWP switch, the gNBs are intra-frequency with respect to the new BWP so that the UE 105 will be able to continue to measure DL signals from these gNBs. Thus, the assistance data may include information for positioning reference signals transmitted by the serving gNB and neighbor gNBs in the wireless network that are intra-frequency with respect to a new BWP, wherein the BWP switching pattern indicates a switch of the UE by the serving gNB to the new BWP. The LMF 120 may determine to prohibit BWPs for use in the positioning session with the UE 105. The prohibited BWP may be either a singleton or a list, e.g., a subset of the configured BWPs, that is not be used during the positioning session. The LMF 120, for example, may determine that there are specific BWPs from which there are no inter-frequency neighbor gNBs for measurement, and the LMF 120 may accordingly, prohibit those BWPs from use during the positioning session. Additionally, the LMF 120 may use prohibited BWPs for interference management during the positioning session, e.g., to the use of BWPs that may affect measurements, 5G NR based radio measurement or other types of measurements such as multi-band GNSS measurement, which may lead to poor position fixes. Thus, the LMF 120 may determine the prohibited BWPs based on the BWPs used for transmission and reception received at stage 3, by identifying BWPs that will interfere with location information measurements performed by the UE during the position session. The LMF 120, thus, may request the serving gNB 110-1 prohibit the use of certain BWPs during the positioning session that may cause de-sense during the measurement of the other 5G NR neighbor gNBs, either directly or Inter-Mod products from the active transmitters, or from the GNSS receiver.

At stage 5, the LMF 120 sends an NRPPa message including a Prohibit BWP Request Indication to the serving gNB 110-1 that includes the prohibited BWP(s) determined at stage 4 and optionally an expected duration of the positioning session. The Prohibit BWP Request Indication may be acknowledged, e.g., after a UE change of BWP at stage 6. In another implementation, the Prohibit BWP Request Indication is not acknowledged, but a Prohibit BWP Request Failure message may be returned by the serving gNB 110-1 if the prohibited BWPs cannot be avoided, e.g., if the UE 105 cannot change from a prohibited BWP at stage 6.

At stage 6, the serving gNB 110-1 provides a new BWP which is not prohibited to the UE 105 if the UE 105 is currently using a prohibited BWP, and the UE 105 changes from the prohibited BWP to the new BWP. The serving gNB 110-1 may also ensure that no prohibited BWP is assigned to the UE 105 for the expected duration of the position session if this was included at stage 5.

At stage 7, the LMF 120 sends an LPP Provide Assistance Data message to the UE 105 to provide the AD determined at stage 4. For example, the LPP Provide Assistances Data message may be forwarded to the UE 105 by the serving gNB 110-1.

At stage 8, the LMF 120 sends an LPP Request Location Information message to the UE 105 to request the UE 105 to measure DL PRS transmission by the gNBs 110. For example, the LMF 120 may request measurements of RSTD if OTDOA is used, TOA or RxTx measurements if multi-RTT is used, or AOA or AOD measurements if AOA or AOD are used. The LMF 120 may also indicate whether UE based positioning is requested whereby the UE 105 determines its own location. In some implementations, the LMF 120 may also include in the LPP Request Location Information message a request for location measurements for other position methods which do not use PRS (e.g. WiFi positioning or A-GNSS positioning).

At stage 9, each of the gNBs 110 transmits PRS signals using non-prohibited BWPs. The PRS may be preexisting and may be used to help determine the prohibited BWP(s) at stage 4 and 5, as discussed above.

At stage 10, the UE 105 acquires and measures the DL PRS transmitted using the non-prohibited BWP by the gNBs 110 at stage 9. For example, the UE 105 may obtain RSTD measurements when OTDOA is used, TOA or RxTx measurements when multi-RTT is used, or AOA or AOD measurements when AOA or AOD is used. The UE 105 may also obtain other non-PRS measurements in addition if requested at stage 8.

At stage 11, if UE 105 based positioning was requested at stage 8, the UE 105 determines its location based on the PRS measurements (and any other measurements) obtained at stage 10 and the assistance data received at stage 7.

At stage 12, the UE 105 sends an LPP Provide Location Information message to the LMF 120 and includes the PRS measurements (and any other measurements) obtained at stage 10 or the UE location obtained at stage 11. For example, the LPP Provide Location Information message may be forwarded to the LMF 120 by the serving gNB 110-1.

At stage 13, the LMF 120 determines the UE location based on any PRS measurements (and any other measurements) received at stage 12 or may verify a UE location received at stage 12.

For some positioning methods (e.g. multi-RTT). LMF 120 may also request UE 105 (e.g. as part of stage 7 or stage 8) to transmit an uplink (UL) PRS or UL Sounding Reference Signal (SRS) and may request one or more gNBs 110 to obtain UL measurements (e.g. RxTx, AOA, TOA and/or RSRP) of the UL PRS or UL SRS. The UL measurements may then be sent by the gNBs 110 to LMF 120 to assist LMF 120 to obtain a location of UE 105 at stage 13 using both the UL measurements and the PRS measurements provided by UE 105 at stage 12.

At stage 14, the LMF 120 returns an Nlmf_Location_DetermineLocation Response to the AMF 115 to return the location obtained at stage 13.

At stage 15, the LMF 120 may send an NRPPa message including a Cancel Prohibited BWP(s) to each of the gNBs 110 in order to cancel the prohibited BWP(s). If a session time for the prohibited BWP(s) was provided to the gNBs 110 at stage 5, stage 15 may be unnecessary.

Figure 7:
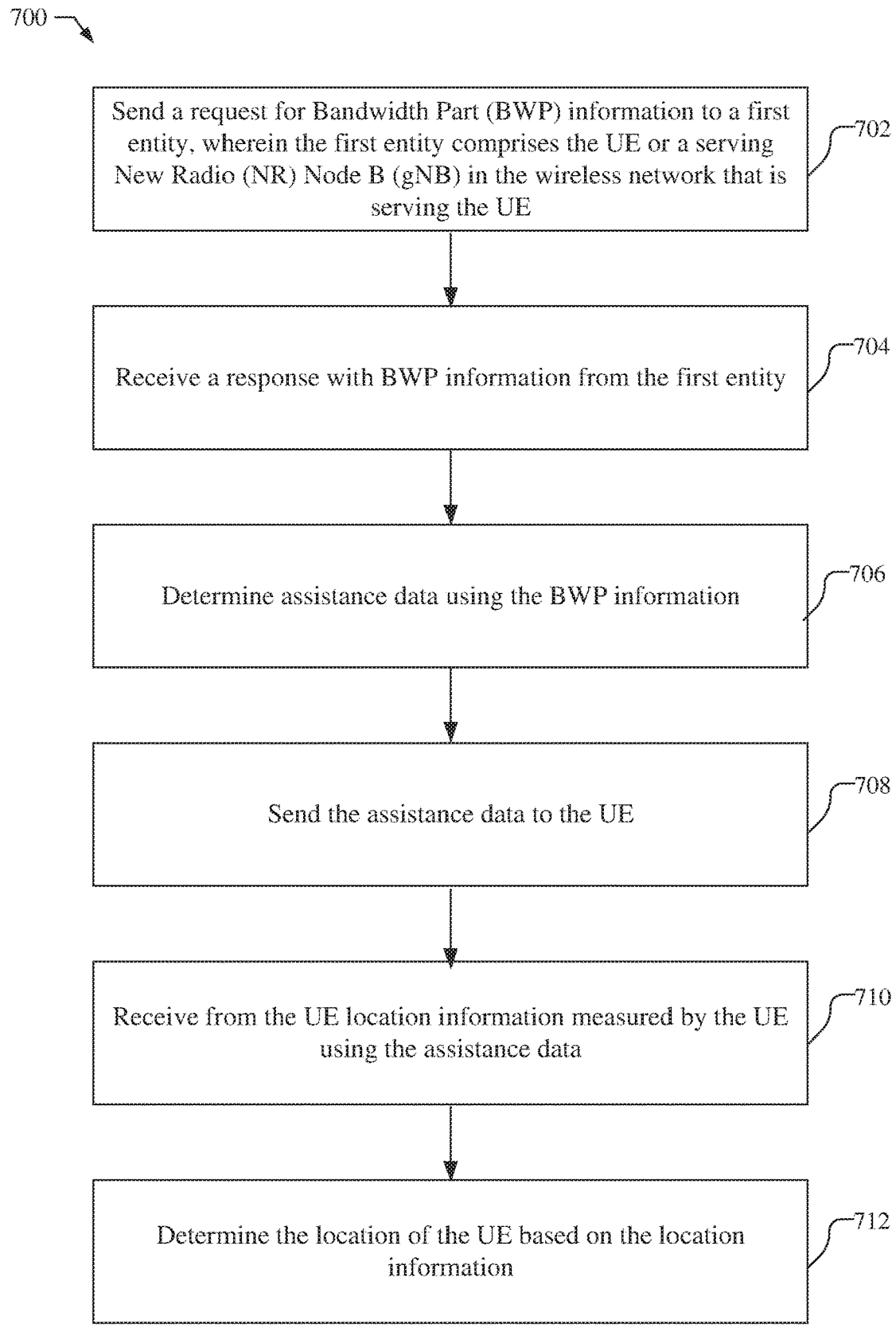
FIG. 7 is a flowchart of an example procedure for UE location using BWP performed by a location server.

FIG. 7 shows a flowchart of an example procedure 700 for supporting location of a user equipment (UE) such as the UE 105 in FIG. 1. The procedure 700 may be performed by a location server in a wireless network, such as LMF 120 shown in FIG. 1 or by an LMC.

As illustrated, at block 702, the location server sends a request for Bandwidth Part (BWP) information to a first entity, wherein the first entity comprises the UE or a serving New Radio (NR) Node B (gNB) in the wireless network that is serving the UE, e.g., gNB 110-1, which is discussed at stage 2 in FIGS. 3-6. At block 704, the location receiver receives a response with BWP information from the first entity, e.g., as discussed at stage 3 in FIGS. 3-6. At block 706, the location receiver determines assistance data using the BWP information, e.g., as discussed at stage 4 in FIGS. 3-6. For example, assistance data may be generated or identified based on the BWP information or assistance data may be filtered based on the BWP information. At block 708, the location receiver sends the assistance data to the UE, e.g., as discussed at stage 5 in FIG. 3, and stage 7 in FIGS. 4-6. At block 710, the location receiver receives from the UE location information measured by the UE using the assistance data, e.g., as discussed at stage 10 in FIG. 3, and stage 12 in FIGS. 4-6. At block 712, the location receiver determines the location of the UE based on the location information, e.g., as discussed at stage 11 in FIG. 3, and stage 13 in FIGS. 4-6.

In one implementation, the first entity may be the serving gNB, and the request for BWP information and the response with BWP information may be transmitted using an NR Positioning Protocol A (NRPPa), e.g., as discussed at stages 2 and 3 in FIGS. 3, 5 and 6.

In one implementation, the BWP information may be active BWP for the UE, a list of configured BWPs or both, e.g., as discussed at stage 3 in FIGS. 3, 5 and 6. In some implementations, the request for BWP information may include an estimate of a positioning session time for the UE, wherein the list of configured BWPs comprises BWPs that will be active during the positioning session time, e.g., as discussed at stages 2 and 3 in FIGS. 3, 5 and 6. The assistance data may be assistance data for the active BWP, the list of configured BWPs that will be active during the positioning session time, or both, e.g., as discussed at stage 4 in FIGS. 3, 5 and 6. The assistance data may further include information for positioning reference signals transmitted by the serving gNB and neighbor gNBs in the wireless network that are intra-frequency with respect to the active BWP, the list of configured BWPs that will be active during the positioning session time, or both, e.g., as discussed at stage 4 in FIGS. 3, 5 and 6.

In some implementations, the BWP information may further include a BWP switching pattern for the serving gNB, e.g., as discussed at stage 3 in FIGS. 3, 5 and 6. The assistance data may include information for positioning reference signals transmitted by the serving gNB and neighbor gNBs in the wireless network that are intra-frequency with respect to a new BWP, wherein the BWP switching pattern indicates a switch of the UE by the serving gNB to the new BWP, e.g., as discussed at stage 4 in FIGS. 3, 5 and 6.

In one implementation, the location server may receive BWP information from neighbor gNBs in the wireless network, e.g., as discussed at stage 3 in FIG. 5. The location server may determine a preferred BWP for the UE using the BWP information from the serving gNB and the BWP information from the neighbor gNBs, e.g., as discussed at stage 4 in FIG. 5. The location server may send the preferred BWP to the serving gNB, e.g., as discussed at stage 5 in FIG. 5. The preferred BWP may include a single BWP or a list of BWPs, e.g., as discussed at stage 4 in FIG. 5. In one implementation, the serving gNB may switch the UE to a BWP included in the preferred BWP, e.g., as discussed at stage 6 in FIG. 5.

In one implementation, the location server may receive BWP information from neighbor gNBs in the wireless network, e.g., as discussed at stage 3 in FIG. 6. The location server may determine prohibited BWP for a positioning session with the UE using the BWP information from the serving gNB and the BWP information from the neighbor gNBs, e.g., as discussed at stage 4 in FIG. 6. The location server may send the prohibited BWP to the serving gNB, e.g., as discussed at stage 5 in FIG. 6. The prohibited BWP may be a single BWP or a list of BWPs, e.g., as discussed at stage 4 in FIG. 6. In one implementation, the location server determines the prohibited BWP for the positioning session with the UE by identifying BWPs for which there are insufficient neighbor gNBs to transmit positioning reference signals that are intra-frequency with respect to the identified BWPs, e.g., as discussed at stage 4 in FIG. 6. In one implementation, the BWP information may include an identification of BWPs used for transmission and reception, e.g., as discussed at stage 3 in FIG. 6, and the location server may determine the prohibited BWP for the positioning session with the UE by identifying BWPs that will interfere with location information measurements performed by the UE during the position session, e.g., as discussed at stage 4 in FIG. 6.

In one implementation, the first entity may be the UE, and the request for BWP information and the response with BWP information may be transmitted during a capability exchange using a Long Term Evolution Positioning Protocol (LPP), e.g., as discussed at stage 2 and 3 in FIG. 4. The BWP information may include an active BWP for the UE, a list of configured BWPs, or both, e.g., as discussed at stage 3 in FIG. 4. The BWP information may include an on-demand request for positioning reference signals on the active BWP so that the UE can measure location information using positioning signals that are intra-frequency with respect to the active BWP, e.g., as discussed at stage 3 of FIG. 4. The BWP information may further include an ordered list of BWPs based on a prior usage of BWPs by the serving gNB, e.g., as discussed at stage 3 of FIG. 4.

Figure 8:
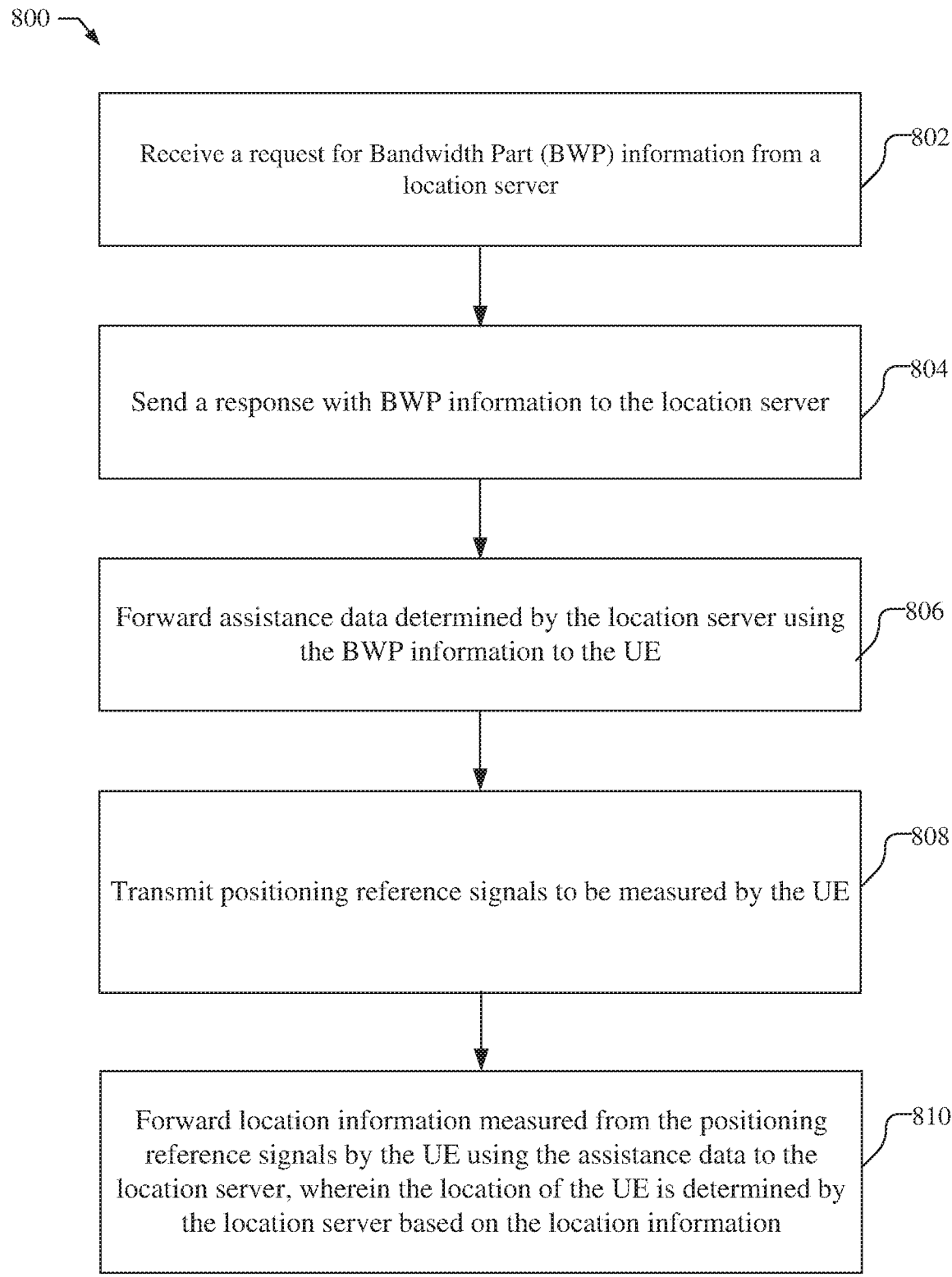
FIG. 8 is a flowchart of an example procedure for UE location using BWP performed by a serving base station.

FIG. 8 shows a flowchart of an example procedure 800 for supporting location of a user equipment (UE) such as the UE 105 in FIG. 1. The procedure 800 may be performed by a New Radio (NR) Node B (gNB) in a wireless network that is serving the UE, such as gNB 110-1, shown in FIG. 1.

As illustrated, at block 802, the gNB receives a request for Bandwidth Part (BWP) information from a location server, e.g., LMF 120, which is discussed at stage 2 in FIGS. 3, 5 and 6. At block 804, the gNB sends a response with BWP information to the location server, e.g., as discussed at stage 3 in FIGS. 3, 5 and 6. At block 806, the gNB forwards assistance data determined by the location server using the BWP information to the UE, e.g., as discussed at stage 5 in FIG. 3, and stage 7 in FIGS. 5 and 6. At block 808, the gNB may transmit positioning reference signals to be measured by the UE, e.g., as discussed at stage 7 in FIG. 3, and stage 9 in FIGS. 5 and 6. At block 810, the gNB forwards location information measured from the positioning reference signals by the UE using the assistance data to the location server, wherein the location of the UE is determined by the location server based on the location information, e.g., as discussed at stage 10 in FIG. 3, and stage 12 in FIGS. 5 and 6.

In one implementation, the request for BWP information and the response with BWP information are transmitted using an NR Positioning Protocol A (NRPPa), e.g., as discussed at stages 2 and 3 in FIGS. 3, 5 and 6.

In one implementation, the BWP information may be active BWP for the UE, a list of configured BWPs or both, e.g., as discussed at stage 3 in FIGS. 3, 5 and 6. In some implementations, the request for BWP information may include an estimate of a positioning session time for the UE, wherein the list of configured BWPs comprises BWPs that will be active during the positioning session time, e.g., as discussed at stages 2 and 3 in FIGS. 3, 5 and 6. The assistance data may be assistance data for the active BWP, the list of configured BWPs that will be active during the positioning session time, or both, e.g., as discussed at stage 4 in FIGS. 3, 5 and 6. The assistance data may further include information for positioning reference signals transmitted by the serving gNB and neighbor gNBs in the wireless network that are intra-frequency with respect to the active BWP, the list of configured BWPs that will be active during the positioning session time, or both, e.g., as discussed at stage 4 in FIGS. 3, 5 and 6.

In some implementations, the BWP information may further include a BWP switching pattern for the serving gNB, e.g., as discussed at stage 3 in FIGS. 3, 5 and 6. The assistance data may include information for positioning reference signals transmitted by the serving gNB and neighbor gNBs in the wireless network that are intra-frequency with respect to a new BWP, wherein the BWP switching pattern indicates a switch of the UE by the serving gNB to the new BWP, e.g., as discussed at stage 4 in FIGS. 3, 5 and 6.

In one implementation, the gNB may receive a preferred BWP for the UE from the location server, wherein the preferred BWP is determined by the location server using the BWP information from the serving gNB and BWP information from the neighbor gNBs, wherein transmitting the positioning reference signals to be measured by the UE comprises transmitting the positioning reference signals using the preferred BWP, e.g., as discussed at stages 4, 5 and 9 in FIG. 5. The preferred BWP may include a single BWP or a list of BWPs, e.g., as discussed at stage 4 in FIG. 5. In one implementation, the gNB may switch the UE to a BWP included in the preferred BWP, e.g., as discussed at stage 6 in FIG. 5.

In one implementation, the gNB may receive prohibited BWP for a positioning session with the UE from the location server, wherein the prohibited BWP are determined by the location server using the BWP information from the serving gNB and BWP information from the neighbor gNBs, wherein transmitting the positioning reference signals to be measured by the UE comprises transmitting the positioning reference signals using a non-prohibited BWP, e.g., as discussed at stages 4, 5 and 9 FIG. 6. The prohibited BWP may be a single BWP or a list of BWPs, e.g., as discussed at stage 4 in FIG. 6. In one implementation, the prohibited BWP for the positioning session with the UE are determined by the location based on identified BWPs for which there are insufficient neighbor gNBs to transmit positioning reference signals that are intra-frequency with respect to the identified BWPs, e.g., as discussed at stage 4 in FIG. 6. In one implementation, the BWP information may include an identification of BWPs used for transmission and reception, e.g., as discussed at stage 3 in FIG. 6, and the prohibited BWP for the positioning session with the UE is determined by the location based on identified BWPs that will interfere with location information measurements performed by the UE during the position session, e.g., as discussed at stage 4 in FIG. 6.

Figure 9:
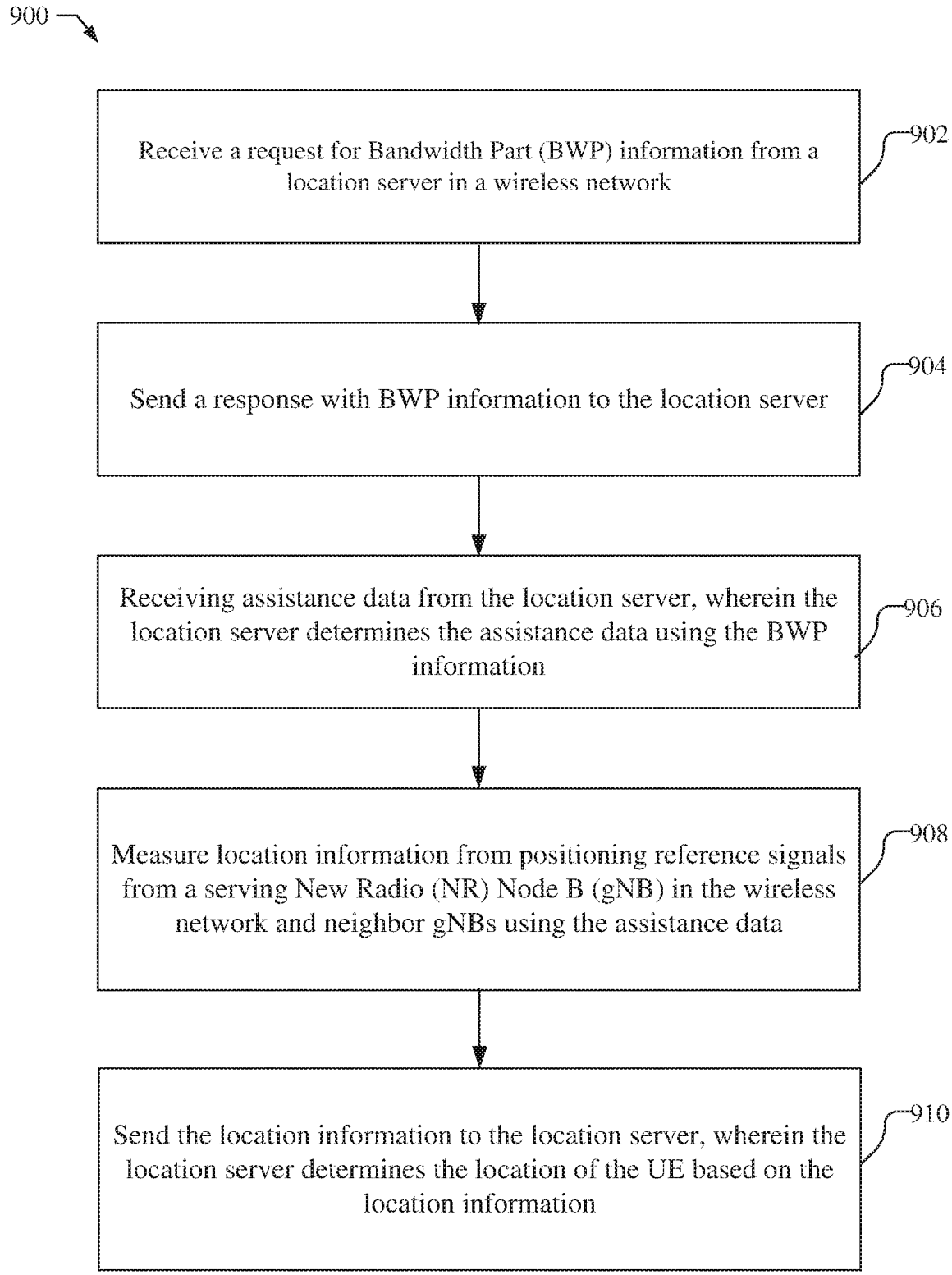
FIG. 9 is a flowchart of an example procedure for UE location using BWP performed by the UE.

FIG. 9 shows a flowchart of an example procedure 900 for supporting location of a user equipment (UE) such as the UE 105 in FIG. 1. The procedure 900 may be performed by the UE.

As illustrated, at block 902, the UE receives a request for Bandwidth Part (BWP) information from a location server, e.g., LMF 120, in a wireless network location, e.g., as discussed at stage 2 in FIG. 4. At block 904, the UE sends a response with BWP information to the location server, e.g., as discussed at stage 3 in FIG. 4. At block 906, the UE receives assistance data from the location server, wherein the location server determines the assistance data using the BWP information, e.g., as discussed at stages 4 and 7 in FIG. 4. At block 908, the UE measures location information from positioning reference signals from a serving New Radio (NR) Node B (gNB), e.g., gNB 110-1, in the wireless network and neighbor gNBs, e.g., gNB 110-2 and 110-3, using the assistance data, e.g., as discussed at stages 10 and 11 in FIG. 4. At block 910, the UE sends the location information to the location server, wherein the location server determines the location of the UE based on the location information, e.g., as discussed at stages 12 and 13 in FIG. 4.

In one implementation, the request for BWP information and the response with BWP information are transmitted during a capability exchange using a Long Term Evolution Positioning Protocol (LPP), e.g., as discussed at stage 2 and 3 in FIG. 4.

The BWP information may include an active BWP for the UE, a list of configured BWPs, or both, e.g., as discussed at stage 3 in FIG. 4.

The BWP information may include a request for positioning reference signals on each BWP in the active BWP and the list of configured BPWs such that the UE can measure location information after a switch to a new BWP by the serving gNB from neighbor gNBs that transmit positioning signals that are intra-frequency with respect to the new BWP, e.g., as discussed at stage 3 of FIG. 4. The BWP information may further include an ordered list of BWPs based on a prior usage of BWPs by the serving gNB, e.g., as discussed at stage 3 of FIG. 4.

Figure 10:
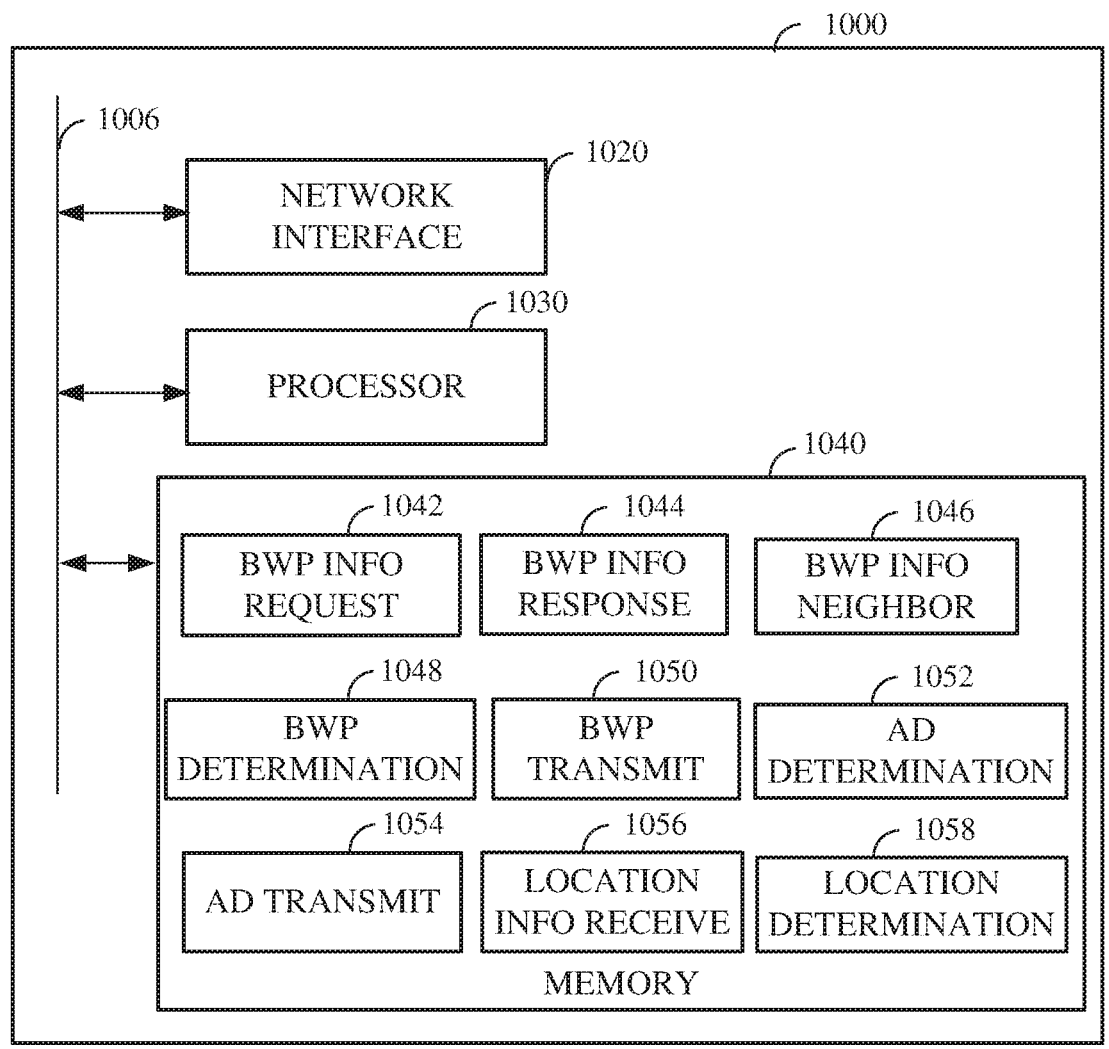
FIG. 10 is a block diagram of a hardware implementation of a location server capable of UE location using BWP.

FIG. 10 shows a diagram of a hardware implementation of a location server 1000, such as a LMF 120 or an LMC, which may be similar to, and be configured to have a functionality similar to that depicted or described, for example, with reference to FIGS. 1-7. The location server 1000 may include a network interface 1020 to communicate with other network nodes (e.g., sending and receiving queries and responses), e.g., to base stations and the UE. For example, each network element may be configured to communicate (e.g., via wired or wireless backhaul communication) with a gateway, or other suitable device of a network, to facilitate communication with one or more core network nodes (e.g., any of the other nodes and elements shown in FIG. 1).

The location server 1000 may include, in some embodiments, at least one processor 1030 (also referred to as a controller) and memory 1040 to manage communications with other nodes (e.g., sending and receiving messages), to generate communication signals (including to generate communication frames, signals and/or messages with adjustable quantities of resources that are allocated for location-related information such as PRS transmissions and assistance data transmissions), and to provide other related functionality, including functionality to implement the various processes and methods described herein. The one or more processors 1030 and memory 1040 may be coupled together with bus

1006. The one or more processors 1030 and other components of the location server 1000 may similarly be coupled together with bus 1006, a separate bus, or may be directly connected together or coupled using a combination of the foregoing. The memory 1040 may contain executable code or software instructions that when executed by the one or more processors 1030 cause the one or more processors 1030 to operate as a special purpose computer programmed to perform the procedures and techniques disclosed herein (e.g. such as the process flow 700).

As illustrated in FIG. 10, the memory 1040 includes one or more components or modules that when implemented by the one or more processors 1030 implements the methodologies as described herein. While the components or modules are illustrated as software in memory 1040 that is executable by the one or more processors 1030, it should be understood that the components or modules may be dedicated hardware either in the processor or off processor. As illustrated, the memory 1040 may include a BWP information request module 1042 that enables the one or more processors 1030 to send a request for BWP information to an entity, such as the UE or a serving NR gNB, via network interface 1020, requesting BWP information, e.g., as illustrated at stage 2 of FIGS. 3-6. In one implementation, the entity may be a serving gNB and the request for BWP information may be transmitted using an NR Positioning Protocol A (NRPPa). The request for BWP information may include an estimate of a positioning session time for the UE. In one implementation, the entity may be the UE and the request for BWP information may be transmitted during a capability exchange using a Long Term Evolution Positioning Protocol (LPP).

The memory 1040 may further include a BWP information response module 1044 that enables the one or more processors 1030 to receive one or more responses to the request for BWP information from the requested entity, via the network interface 1020, e.g., as illustrated at stage 3 of FIGS. 3-6. The BWP information may be an active BWP for the UE, a list of configured BWPs or both. In one implementation, the entity may be the serving gNB and the response with BWP information may be transmitted using an NR Positioning Protocol A (NRPPa). The list of configured BWPs may include BWPs that will be active during the positioning session time. The BWP information may include a BWP switching pattern for the serving gNB. In one implementation, the entity may be the UE and the response with BWP information are transmitted during a capability exchange using a Long Term Evolution Positioning Protocol (LPP). The BWP information may be an on-demand request for positioning reference signals on the active BWP so that the UE can measure location information using positioning signals that are intra-frequency with respect to the active BWP. The BWP information may be an ordered list of BWPs based on a prior usage of BWPs by the serving gNB.

The memory 1040 may further include a BWP information neighbor module 1046 that enables the one or more processors 1030 to receive BWP information from neighbor gNBs in the wireless network, via the network interface 1020, e.g., as illustrated at stages 2 and 3 of FIGS. 5 and 6.

The memory 1040 may further include a BWP determination module 1048 that enables the one or more processors 1030 to determine BWP information relevant to a UE during a positioning session, e.g., as illustrated at stage 4 of FIGS. 3-6. In one implementation, the one or more processors 1030 may be enabled to determine a preferred BWP for the UE using the BWP information from the serving gNB and the BWP information from the neighbor gNBs, e.g., as illustrated at stage 4 of FIG. 5. The preferred BWP may be a single BWP or a list of BWPs. In one implementation, the one or more processors 1030 may be enabled to determine prohibited BWP for a positioning sessions with the UE using the BWP information from the serving gNB and the BWP information from the neighbor gNBs, e.g., as illustrated at stage 4 of FIG. 6. The prohibited BWP may be a single BWP or a list of BWPs. In one example, the one or more processors 1030 may identify BWPs for which there are insufficient neighbor gNBs to transmit positioning reference signals that are intra-frequency with respect to the identified BWPs, or identify BWPs that will interfere with location information measurements performed by the UE during the positioning session.

The memory 1040 may further include a BWP transmit module 1050 that enables the one or more processors 1030 to send a preferred BWP or prohibited BWP to the serving gNB, via the network interface 1020, e.g., as illustrated at stages 5 of FIGS. 4-6.

The memory 1040 may include an assistance data (AD) determination module 1052 that enables the one or more processors 1030 to determine AD for the UE based on the received BWP information, e.g., as discussed at stage 4 in FIGS. 3-6. The memory 1040 may further include an AD transmit module 1054 that enables the one or more processors 1030 to send a message to the UE, e.g., via network interface 1020, that includes the determined AD, e.g., as discussed at stage 5 of FIG. 3 and stages 7 of FIGS. 4-6. The assistance data may include assistance data for the active BWP, the list of configured BWPs that will be active during the positioning session time, or both. The assistance data may further include information for positioning reference signals transmitted by the serving gNB and neighbor gNBs in the wireless network that are intra-frequency with respect to the active BWP, the list of configured BWPs that will be active during the positioning session time, or both. The assistance data may include information for positioning reference signals transmitted by the serving gNB and neighbor gNBs in the wireless network that are intra-frequency with respect to a new BWP, wherein a BWP switching pattern may indicate a switch of the UE by the serving gNB to the new BWP.

The memory 1040 may include a location information receive module 1056 that enables the one or more processors 1030 to receive, via network interface 1020, location information measured by the UE during the positioning session, e.g., as discussed at stage 10 of FIG. 3 and stages 12 of FIGS. 4-6. The memory 1040 may include a location determination module 1058 that enables the one or more processors 1030 to determine the location of the UE based on the received location information, e.g., as discussed at stage 11 of FIG. 3 and stages 13 of FIGS. 4-6.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM. EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1040, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In one implementation, a location server in a wireless network, such as location server 1000, is configured to support location determination of a user equipment (UE) comprises a means for sending a request for Bandwidth Part (BWP) information to a first entity, wherein the first entity comprises the UE or a serving New Radio (NR) Node B (gNB) in the wireless network that is serving the UE, which may be, e.g., the network interface 1020 and one or more processors 1030 with dedicated hardware or implementing executable code or software instructions in memory 1040, such as the BWP information request module 1042. A means for receiving a response with BWP information from the first entity, may be, e.g., the network interface 1020 and one or more processors 1030 with dedicated hardware or implementing executable code or software instructions in memory 1040, such as the BWP information response module 1044. A means for determining assistance data using the BWP information may be, e.g., the one or more processors 1030 with dedicated hardware or implementing executable code or software instructions in memory 1040, such as the AD determination module 1052. A means for sending the assistance data to the UE may be, e.g., the network interface 1020 and one or more processors 1030 with dedicated hardware or implementing executable code or software instructions in memory 1040, such as the AD transmit module 1054. A means for receiving from the UE location information measured by the UE using the assistance data may be, e.g., the network interface 1020 and one or more processors 1030 with dedicated hardware or implementing executable code or software instructions in memory 1040, such as the location information receive module 1056. A means for determining a location of the UE based on the location information may be, e.g., the one or more processors 1030 with dedicated hardware or implementing executable code or software instructions in memory 1040, such as the location determination module 1058.

In one implementation, the first entity may be the serving gNB and the request for BWP information and the response with BWP information may be transmitted using an NR Positioning Protocol A (NRPPa), and the location server may further include a means for receiving BWP information from neighbor gNBs in the wireless network, which may be, e.g., the network interface 1020 and one or more processors 1030 with dedicated hardware or implementing executable code or software instructions in memory 1040, such as the BWP information neighbor module 1046. A means for determining a preferred BWP for the UE using the BWP information from the serving gNB and the BWP information from the neighbor gNBs may be, e.g., the network interface 1020 and one or more processors 1030 with dedicated hardware or implementing executable code or software instructions in memory 1040, such as the BWP determination module 1048. A means for sending the preferred BWP to the serving gNB may be, e.g., the network interface 1020 and one or more processors 1030 with dedicated hardware or implementing executable code or software instructions in memory 1040, such as the BWP transmit module 1050.

In one implementation, the first entity may be the serving gNB and the request for BWP information and the response with BWP information may be transmitted using an NR Positioning Protocol A (NRPPa), and the location server may further include a means for receiving BWP information from neighbor gNBs in the wireless network, which may be, e.g., the network interface 1020 and one or more processors 1030 with dedicated hardware or implementing executable code or software instructions in memory 1040, such as the BWP information neighbor module 1046. A means for determining prohibited BWP for a positioning session with the UE using the BWP information from the serving gNB and the BWP information from the neighbor gNBs may be, e.g., the network interface 1020 and one or more processors 1030 with dedicated hardware or implementing executable code or software instructions in memory 1040, such as the BWP determination module 1048. A means for sending the prohibited BWP to the serving gNB may be, e.g., the network interface 1020 and one or more processors 1030 with dedicated hardware or implementing executable code or software instructions in memory 1040, such as the BWP transmit module 1050.

Figure 11:
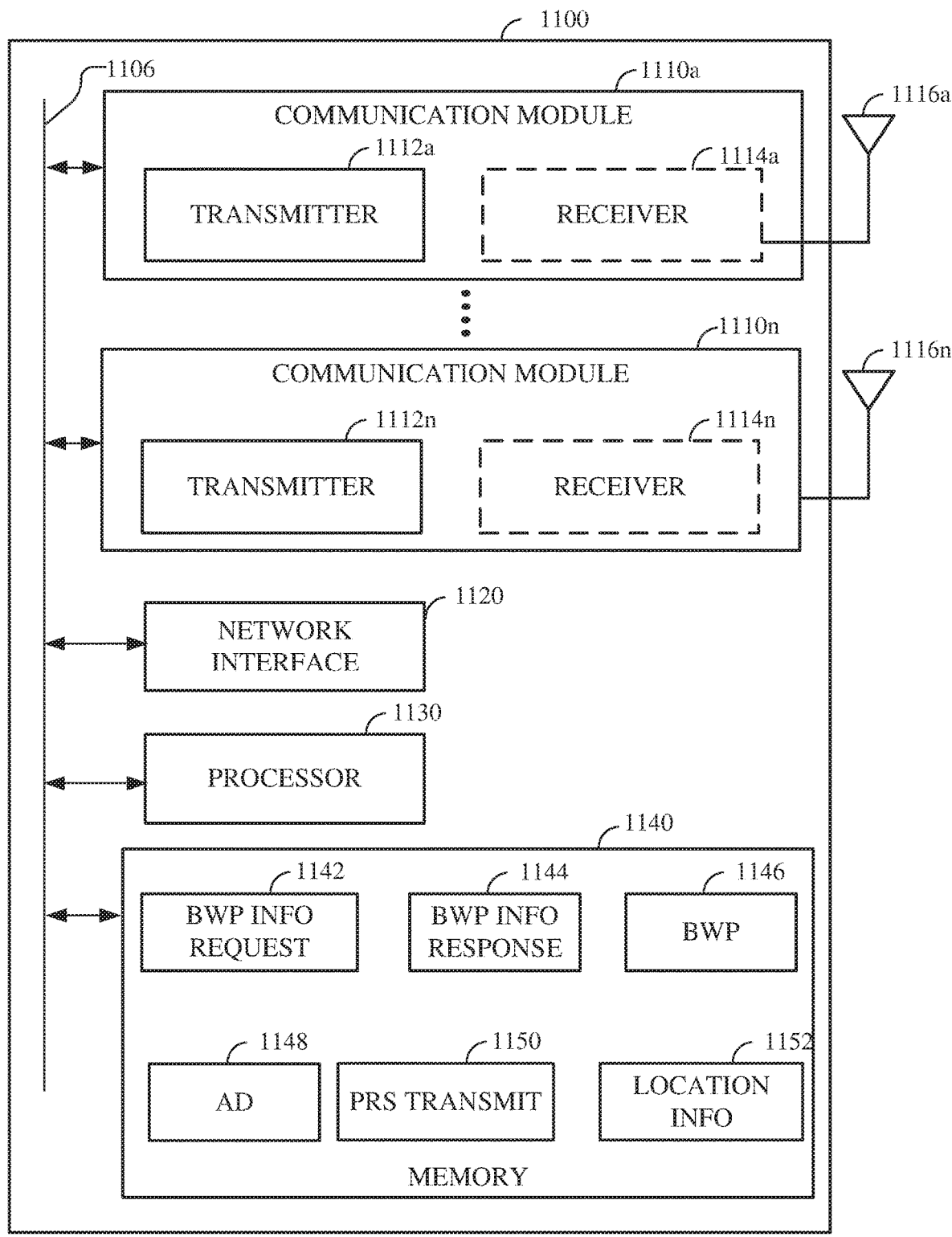
FIG. 11 is a block diagram of hardware implementation of a base station capable of UE location using BWP.

FIG. 11 shows a diagram of a hardware implementation of a base station 1100, such as a gNB 110, which may be similar to, and be configured to have a functionality similar to that depicted or described, for example, with reference to FIGS. 1-6 and 8. The base station 1100 may include one or more communication modules 1110a-n, sometimes referred to as external interfaces, electrically coupled to one more antennas 1116a-n for communicating with wireless devices, such as, for example, the UE 105 of FIG. 1. The each of the communication modules 1110a-810n may include a respective transmitter 1112a-n for sending signals (e.g., downlink messages and signals, which may be arranged in frames, and which may include positioning reference signals and/or assistance data whose quantity may be controlled/varied as described herein) and, optionally (e.g., for nodes configured to receive and process uplink communications) a respective receiver 1114a-n. In embodiments in which the implemented node includes both a transmitter and a receiver, the communication module comprising the transmitter and receiver may be referred to as a transceiver. The base station 1100 may also include another external interface, e.g., a network interface 1120, to communicate with other network nodes (e.g., sending and receiving queries and responses). For example, each network element may be configured to communicate (e.g., via wired or wireless backhaul communication) with a gateway, or other suitable device of a network, to facilitate communication with one or more core network nodes (e.g., any of the other nodes and elements shown in FIG. 1). Additionally, and/or alternatively, communication with other network nodes may also be performed using the communication modules 1110a-n and/or the respective antennas 1116a-n.

The base station 1100 may include, in some embodiments, at least one processor 1130 (also referred to as a controller) and memory 1140 to manage communications with other nodes (e.g., sending and receiving messages), to generate communication signals (including to generate communication frames, signals and/or messages with adjustable quantities of resources that are allocated for location-related information such as PRS transmissions and assistance data transmissions), and to provide other related functionality, including functionality to implement the various processes and methods described herein. The one or more processors 1130 and memory 1140 may be coupled together with bus 1106. The one or more processors 1130 and other components of the base station 1100 may similarly be coupled together with bus 1106, a separate bus, or may be directly connected together or coupled using a combination of the foregoing. The memory 1140 may contain executable code or software instructions that when executed by the one or more processors 1130 cause the one or more processors 1130 to operate as a special purpose computer programmed to perform the procedures and techniques disclosed herein (e.g. such as the process flow 800).

As illustrated in FIG. 11, the memory 1140 includes one or more components or modules that when implemented by the one or more processors 1130 implements the methodologies as described herein. While the components or modules are illustrated as software in memory 1140 that is executable by the one or more processors 1130, it should be understood that the components or modules may be dedicated hardware either in the processor or off processor. As illustrated, the memory 1140 may include a BWP information request module 1142 that enables the one or more processors 1130 to receive a request for BWP information from a location server, e.g., via an external interface, such as the network interface 1120, e.g., as illustrated at stage 2 of FIGS. 3, 5 and 6. The request for BWP information may be transmitted by the network interface 1120 using an NR Positioning Protocol A (NRPPa). The request for BWP information, for example, may include an estimate of a positioning session time for the UE.

The memory 1140 may include a BWP information response module 1144 that enables the one or more processors 1130 to send a response with BWP information to the location server, e.g., via an external interface, such as the network interface 1120, e.g., as illustrated at stage 3 of FIGS. 3, 5 and 6. The response with BWP information may be transmitted by the network interface 1120 using an NR Positioning Protocol A (NRPPa). The BWP information, for example, may be an active BWP for the UE, a list of configured BWPs or both. The list of configured BWPs may include BWPs that will be active during a positioning session time.

The memory 1140 may include a BWP module 1146 that enables the one or more processors 1130 to control transmission and reception, e.g., via communication module 1110, using BWP. The BWP module 1146, may further enable the one or more processors 1030 to receive a message from the location server, e.g., via network interface 1120, that includes the preferred BWP, e.g., as illustrated at stage 5 of FIG. 5, wherein the preferred BWP is determined by the location server using the BWP information from the serving gNB and BWP information from the neighbor gNBs, wherein the positioning reference signals to be measured by the UE are transmitted using the preferred BWP. The preferred BWP may be a single BWP or a list of BWPs. The BWP module 1146 may further enable the one or more processors 1130 to switch the UE to a BWP included in the preferred BWP, e.g., via an external interface, such as communication module 1110a, e.g., as illustrated at stage 6 of FIG. 5. In one implementation, the BWP module 1146 enables the one or more processors 1130 to receive prohibited BWP for a positioning session with the UE from the location server, e.g., via an external interface, such as network interface 1120, e.g., as illustrated at stage 5 of FIG. 6, wherein the prohibited BWP are determined by the location server using the BWP information from the serving gNB and BWP information from the neighbor gNBs; wherein the positioning reference signals to be measured by the UE are transmitted using a non-prohibited BWP. The prohibited BWP may be a single BWP or a list of BWPs. The BWP information may include an identification of BWPs used for transmission and reception, wherein the prohibited BWP for the positioning session with the UE is determined by the location based on identified BWPs that will interfere with location information measurements performed by the UE during the positioning session.

The memory 1140 may include an assistance data (AD) module 1148 that enables the one or more processors 1130 to receive assistance data determined by the location server using the BWP information from the location server and to forward the assistance data to the UE, e.g., via an external interface, such as network interface 1120 and the communication module 1110a, e.g., as illustrated at stage 5 of FIG. 3 and stage 7 of FIGS. 5 and 6. The assistance data may include assistance data for the active BWP, the list of configured BWPs that will be active during the positioning session time, or both. The assistance data may further include information for positioning reference signals transmitted by the serving gNB and neighbor gNBs in the wireless network that are intra-frequency with respect to the active BWP, the list of configured BWPs that will be active during the positioning session time, or both. The BWP information may include a BWP switching pattern for the serving gNB. The assistance data may include information for positioning reference signals transmitted by the serving gNB and neighbor gNBs in the wireless network that are intra-frequency with respect to a new BWP, wherein the BWP switching pattern indicates a switch of the UE by the serving gNB to the new BWP.

The memory 1140 may include a positioning reference signals (PRS) transmit module 1150 that enables the one or more processors 1130 to transmit positioning reference signals to be measured by the UE, e.g., via an external interface, such as the communication module 1110*a*, e.g., as illustrated at stage 7 of FIG. 3 and stage 9 of FIGS. 5 and 6.

The memory 1140 may include a location information module 1152 that enables the one or more processors 1130 to receive location information measured from the positioning reference signals by the UE from the UE and to forward the location information to the location server, wherein a location of the UE is determined by the location server based on the location information, e.g., via an external interface, such as the communication module 110*a* and the network interface 1120, e.g., as illustrated at stage 10 of FIG. 3 and stage 12 of FIGS. 5 and 6.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1140, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In one implementations, a base station, such as base station 1100 that may be a serving gNB 110A for the UE, may be configured to support location determination of UE may include a means for receiving a request for Bandwidth Part (BWP) information from a location server, which may be, e.g., an external interface, such as the network interface 1120, and one or more processors 1130 with dedicated hardware or implementing executable code or software instructions in memory 1140, such as the BWP information request module 1142. A means for sending a response with BWP information to the location server may be, e.g., an external interface, such as the network interface 1120, and one or more processors 1130 with dedicated hardware or implementing executable code or software instructions in memory 1140, such as the BWP information response module 1144. A means for forwarding assistance data determined by the location server using the BWP information to the UE may be, e.g., an external interface, such as the network interface 1120, the communication module 1110*a*, and one or more processors 1130 with dedicated hardware or implementing executable code or software instructions in memory 1140, such as AD module 1148. A means for transmitting positioning reference signals to be measured by the UE may be, e.g., an external interface, such as communication module 1110*a*, and one or more processors 1130 with dedicated hardware or implementing executable code or software instructions in memory 1140, such as PRS transmit module 1150. A means for forwarding location information measured from the positioning reference signals by the UE using the assistance data to the location server, wherein a location of the UE is determined by the location server based on the location information may be, e.g., an external interface, such as communication module 1110*a*, the network interface 1120 and one or more processors 1130 with dedicated hardware or implementing executable code or software instructions in memory 1140, such as the location information module 1152.

In one implementation, the base station may further include a means for receiving a preferred BWP for the UE from the location server, wherein the preferred BWP is determined by the location server using the BWP information from the serving gNB and BWP information from the neighbor gNBs, wherein the positioning reference signals to be measured by the UE are transmitted using the preferred BWP, which may be, e.g., an external interface, such as communication module 1110*a*, and one or more processors 1130 with dedicated hardware or implementing executable code or software instructions in memory 1140, such as BWP module 1146.

In one implementation, the base station may further include a means for receiving prohibited BWP for a positioning session with the UE from the location server, wherein the prohibited BWP are determined by the location server using the BWP information from the serving gNB and BWP information from the neighbor gNBs; wherein the positioning reference signals to be measured by the UE are transmitted using a non-prohibited BWP, which may be, e.g., an external interface, such as communication module 1110*a*, and one or more processors 1130 with dedicated hardware or implementing executable code or software instructions in memory 1140, such as BWP module 1146.

Figure 12:
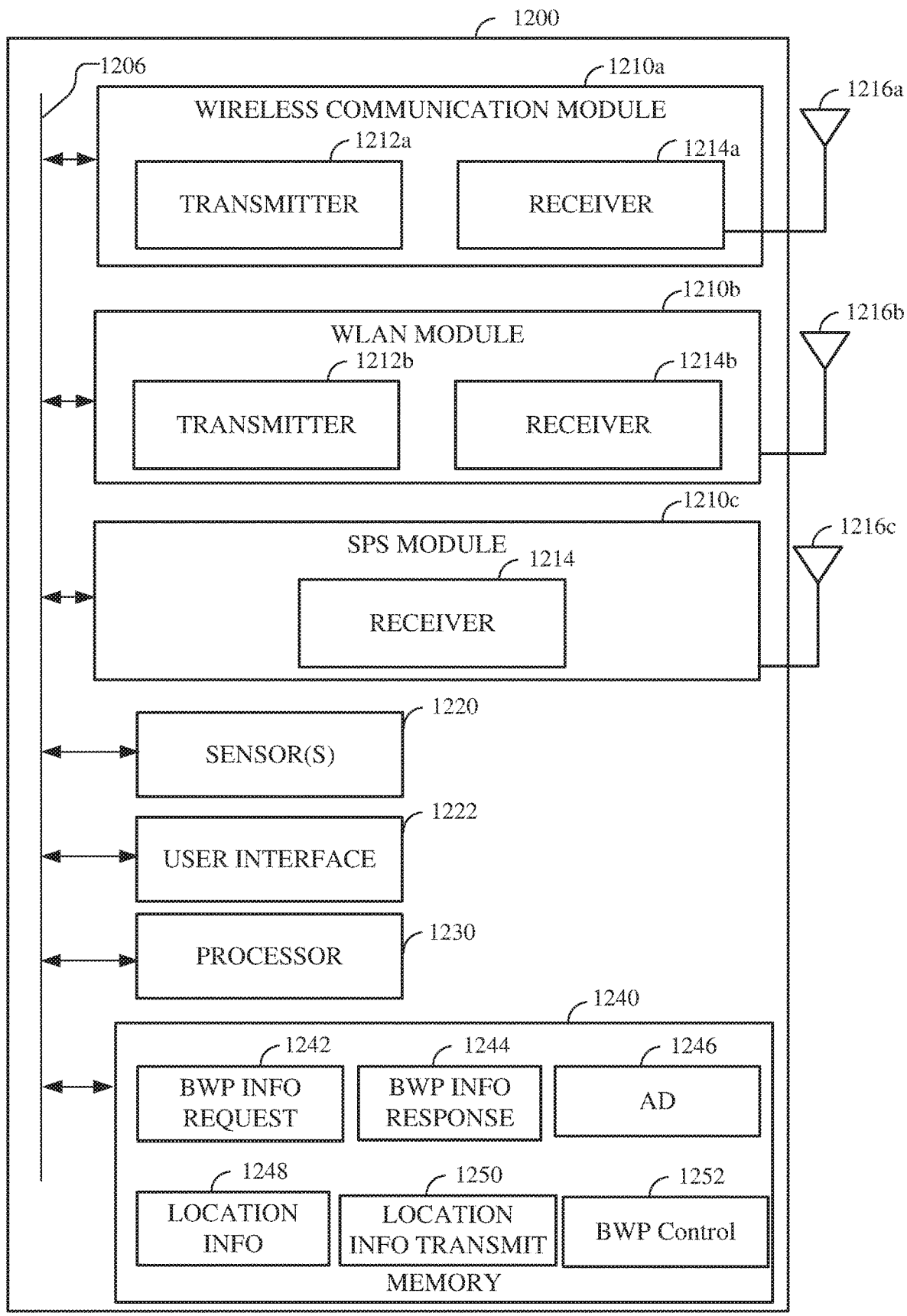
FIG. 12 is a block diagram of hardware implementation of a UE capable of receiving controlled PRS transmissions.

FIG. 12 is a diagram illustrating an example of a hardware implementation of User Equipment (UE) 1200, such as UE 105, which may be similar to, and be configured to have a functionality similar to that depicted or described, for example, with reference to FIGS. 1-6 and 9. The UE 1200 may include one or more communication modules 1210*a-c*, sometimes referred to as external interfaces, electrically coupled to one more antennas 1216*a-c* for communicating with wireless devices, such as, for example, the UE 105 of FIG. 1. For example, the UE 105 may include a wireless communication module 1210*a* to wirelessly communicate with a base station in a Radio Access Network, such as Serving gNB (SgNB) 110-1, as discussed herein, and shown in FIGS. 1-6 and 9. The wireless communication module 1210*a* may include a respective transmitter 1112*a* for sending signals (e.g., uplink messages and signals) and a receiver 1114*a* for receiving signals (e.g., downlink messages and signals, which may be arranged in frames, and including positioning reference signals and/or assistance data whose quantity may be controlled/varied as described herein). The UE 1200 may also include a wireless local area network (WLAN) communication module 1210*b*, with a transmitter 1212*b* and receiver 1214*b* to wirelessly communicate with a wireless local area network. The UE 1200 may further include a SPS module 1210*c*, including an SPS receiver 1214 for receiving and measuring signals from SPS SVs 190, shown in FIG. 1. The UE 1200 may further include one or more sensors 1220, such as cameras, accelerometers, gyroscopes, electronic compass, magnetometer, barometer, etc. The UE 1200 may further include a user interface 1222 that may include e.g., a display, a keypad or other input device, such as virtual keypad on the display, through which a user may interface with the UE 1200.

The UE 1200 further includes one or more processors 1230 (also referred to as a controller) and memory 1240 to manage communications and operation of UE 1200. The one or more processors 1230 and memory 1240 may be coupled together with bus 1206. The one or more processors 1230 and other components of the UE 1200 may similarly be coupled together with bus 1206, a separate bus, or may be directly connected together or coupled using a combination of the foregoing. The memory 1240 may contain executable code or software instructions that when executed by the one or more processors 1230 cause the one or more processors 1230 to operate as a special purpose computer programmed to perform the procedures and techniques disclosed herein (e.g. such as the process flow 900).

As illustrated in FIG. 12, the memory 1240 may include one or more components or modules that may be implemented by the one or more processors 1230 to perform the methodologies described herein. As illustrated in FIG. 12, the memory 1240 includes one or more components or modules that when implemented by the one or more processors 1230 implements the methodologies as described herein. While the components or modules are illustrated as software in memory 1240 that is executable by the one or more processors 1230, it should be understood that the components or modules may be dedicated hardware either in the processor or off processor. As illustrated, the memory 1240 may include a BWP information request module 1242 that enables the one or more processors 1230 to receive a request for BWP information from a location server in a wireless network, via an external interface, such as communication module 1210*a*, e.g., as illustrated in stage 2 of FIG. 3. The request for BWP information may be transmitted during a capability exchange using a Long Term Evolution Positioning Protocol (LPP).

The memory 1240 may include a BWP information response module 1244 that enables the one or more processors 1230 to send a response with BWP information to the location server via an external interface, such as communication module 1210*a*, e.g., as illustrated in stage 3 of FIG. 3. The response with BWP information may be transmitted during a capability exchange using a Long Term Evolution Positioning Protocol (LPP). The BWP information may include an active BWP for the UE, a list of configured BWPs, or both. The BWP information may include an on-demand request for positioning reference signals on the active BWP so that the UE can measure location information using positioning signals that are intra-frequency with respect to the active BWP. The BWP information may further include an ordered list of BWPs based on a prior usage of BWPs by the serving gNB.

The memory 1240 may include an assistance data (AD) module 1246 that enables the one or more processors 1230 to receive, e.g., via wireless communications module 1210*a*, assistance data from a location server that is determined based on BWP information.

The memory 1240 may include a location information module 1248 that enables the one or more processors 1230 to measure location information from positioning reference signals from a serving New Radio (NR) Node B (gNB) in the wireless network and neighbor gNBs using the assistance data, via an external interface, such as communication module 1210*a*, e.g., as illustrated in stages 7 and 8 of FIG. 3.

The memory 1240 may include a location information transmit module 1250 that enables the one or more processors 1230 to send the location information to the location server, via an external interface, such as communication module 1210*a*, e.g., as illustrated in stage 10 of FIG. 3, wherein the location server determines a location of the UE based on the location information.

The memory 1240 may further include a BWP control module 1252 that enables the one or more processors 1230 to control reception, e.g., via wireless communications module 1210*a*, of PRS signals using BWP. The BWP control module 1252, for example, may further enable the one or more processors 1030 to receive a message from a serving gNB, e.g., via wireless communications module 1210*a*, that includes the preferred BWP and/or prohibited PWP, and to control reception, e.g., via wireless communications module 1210*a*, accordingly.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1240, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In one implementation, a UE, such as UE 1200, may be configured to support location determination, and may comprise a means for receiving a request for Bandwidth Part (BWP) information from a location server in a wireless network, which may be, e.g., an external interface, such as the communication module 1210*a*, and one or more processors 1230 with dedicated hardware or implementing executable code or software instructions in memory 1240, such as the BWP information request module 1242. A means for sending a response with BWP information to the location server may be, e.g., an external interface, such as the communication module 1210*a*, and one or more processors 1230 with dedicated hardware or implementing executable code or software instructions in memory 1240, such as the BWP information response module 1244. A means for receiving assistance data from the location server, wherein the location server determines the assistance data using the BWP information may be, e.g., an external interface, such as the communication module 1210*a*, and one or more processors 1230 with dedicated hardware or implementing executable code or software instructions in memory 1240, such as the AD module 1246. A means for measuring location information from positioning reference signals from a serving New Radio (NR) Node B (gNB) in the wireless network and neighbor gNBs using the assistance data may be, e.g., an external interface, such as the communication module 1210*a*, and one or more processors 1230 with dedicated hardware or implementing executable code or software instructions in memory 1240, such as the location information module 1248. A means for sending the location information to the location server, wherein the location server determines a location of the UE based on the location information may be, e.g., an external interface, such as the communication module 1210*a*, and one or more processors 1230 with dedicated hardware or implementing executable code or software instructions in memory 1240, such as the location information transmit module 1250.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device", "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

In one implementation (1), a method for supporting location determination of a user equipment (UE) performed by the UE, the method comprising: receiving a request for Bandwidth Part (BWP) information from a location server in a wireless network; sending a response with BWP information to the location server; receiving assistance data from the location server, wherein the location server determines the assistance data using the BWP information; measuring location information from positioning reference signals from a serving New Radio (NR) Node B (gNB) in the wireless network and neighbor gNBs using the assistance data; and sending the location information to the location server, wherein the location server determines a location of the UE based on the location information.

There may be some implementations (2) of the above-described method (1), wherein the request for BWP information and the response with BWP information are transmitted using a Long Term Evolution Positioning Protocol (LPP).

There may be some implementations (3) of the above-described method (1), wherein the BWP information comprises an active BWP for the UE, a list of configured BWPs, or both.

There may be some implementations (4) of the above-described method (3), wherein the BWP information further comprises an on-demand request for positioning reference signals on the active BWP so that the UE can measure location information using positioning signals that are intra-frequency with respect to the active BWP.

There may be some implementations (5) of the above-described method (3), wherein the BWP information further comprises an ordered list of BWPs based on a prior usage of BWPs by the serving gNB.

In one implementation (6), a user equipment (UE) configured to support location determination of the UE, comprising: an external interface configured to wirelessly communicate with entities in a wireless network; at least one memory; and at least one processor coupled to the external interface and the at least one memory, the at least one processor configured to: receive a request for Bandwidth Part (BWP) information from a location server in the wireless network via the external interface; send a response with BWP information to the location server via the external interface; receive assistance data from the location server via the external interface, wherein the location server determines the assistance data using the BWP information; measure location information from positioning reference signals from a serving New Radio (NR) Node B (gNB) in the wireless network and neighbor gNBs using the assistance data via the external interface; and send the location information to the location server via the external interface, wherein the location server determines a location of the UE based on the location information.

There may be some implementations (7) of the above-described UE (6), wherein the request for BWP information and the response with BWP information are transmitted during a capability exchange using a Long Term Evolution Positioning Protocol (LPP).

There may be some implementations (8) of the above-described UE (6), wherein the BWP information comprises an active BWP for the UE, a list of configured BWPs, or both.

There may be some implementations (9) of the above-described UE (8), wherein the BWP information further comprises an on-demand request for positioning reference signals on the active BWP so that the UE can measure location information using positioning signals that are intra-frequency with respect to the active BWP.

There may be some implementations (10) of the above-described UE (8), wherein the BWP information further comprises an ordered list of BWPs based on a prior usage of BWPs by the serving gNB.

In one implementation (11), a user equipment (UE) configured to support location determination of the UE, comprising: means for receiving a request for Bandwidth Part (BWP) information from a location server in a wireless network; means for sending a response with BWP information to the location server; means for receiving assistance data from the location server, wherein the location server determines the assistance data using the BWP information; means for measuring location information from positioning reference signals from a serving New Radio (NR) Node B (gNB) in the wireless network and neighbor gNBs using the assistance data; and means for sending the location information to the location server, wherein the location server determines a location of the UE based on the location information.

In one implementation (12), a non-transitory storage medium including program code stored thereon, the program code is operable to cause at least one processor in a user equipment (UE) to support location determination, comprising: program code to receive a request for Bandwidth Part (BWP) information from a location server in a wireless network; program code to send a response with BWP information to the location server; program code to receive assistance data from the location server, wherein the location server determines the assistance data using the BWP information; program code to measure location information from positioning reference signals from a serving New Radio (NR) Node B (gNB) in the wireless network and neighbor gNBs using the assistance data; and program code to send the location information to the location server, wherein the location server determines a location of the UE based on the location information.

In one implementation (13), a method for supporting location determination of a user equipment (UE) performed by a New Radio (NR) Node B (gNB) in a wireless network that is serving the UE, the method comprising: receiving a request for Bandwidth Part (BWP) information from a location server; sending a response with BWP information to the location server; forwarding assistance data determined by the location server using the BWP information to the UE; transmitting positioning reference signals to be measured by the UE; and forwarding location information measured from the positioning reference signals by the UE using the assistance data to the location server, wherein a location of the UE is determined by the location server based on the location information.

There may be some implementations (14) of the above-described method (13), wherein the request for BWP information and the response with BWP information are transmitted using an NR Positioning Protocol A (NRPPa).

There may be some implementations (15) of the above-described method (14), wherein the BWP information comprises an active BWP for the UE, a list of configured BWPs or both.

There may be some implementations (16) of the above-described method (15), wherein the request for BWP information includes an estimate of a positioning session time for the UE, wherein the list of configured BWPs comprises BWPs that will be active during the positioning session time.

There may be some implementations (17) of the above-described method (16), wherein the assistance data comprises assistance data for the active BWP, the list of configured BWPs that will be active during the positioning session time, or both.

There may be some implementations (18) of the above-described method (17), wherein the assistance data further comprises information for positioning reference signals transmitted by the serving gNB and neighbor gNBs in the wireless network that are intra-frequency with respect to the active BWP, the list of configured BWPs that will be active during the positioning session time, or both.

There may be some implementations (19) of the above-described method (15), wherein the BWP information further comprises a BWP switching pattern for the serving gNB.

There may be some implementations (20) of the above-described method (19), wherein the assistance data comprises information for positioning reference signals transmitted by the serving gNB and neighbor gNBs in the wireless network that are intra-frequency with respect to a new BWP, wherein the BWP switching pattern indicates a switch of the UE by the serving gNB to the new BWP.

There may be some implementations (21) of the above-described method (13), further comprising: receiving a preferred BWP for the UE from the location server, wherein the preferred BWP is determined by the location server using the BWP information from the serving gNB and BWP information from the neighbor gNBs, wherein transmitting the positioning reference signals to be measured by the UE comprises transmitting the positioning reference signals using the preferred BWP.

There may be some implementations (22) of the above-described method (21), wherein the preferred BWP comprises a single BWP or a list of BWPs.

There may be some implementations (23) of the above-described method (21), further comprising switching the UE to a BWP included in the preferred BWP.

There may be some implementations (24) of the above-described method (13), the method further comprising: receiving prohibited BWP for a positioning session with the UE from the location server, wherein the prohibited BWP are determined by the location server using the BWP information from the serving gNB and BWP information from the neighbor gNBs; wherein transmitting the positioning reference signals to be measured by the UE comprises transmitting the positioning reference signals using a non-prohibited BWP.

There may be some implementations (25) of the above-described method (24), wherein the prohibited BWP comprises a single BWP or a list of BWPs.

There may be some implementations (26) of the above-described method (24), wherein the prohibited BWP for the positioning session with the UE are determined by the location based on identified BWPs for which there are insufficient neighbor gNBs to transmit positioning reference signals that are intra-frequency with respect to the identified BWPs.

There may be some implementations (27) of the above-described method (24), wherein the BWP information comprises an identification of BWPs used for transmission and reception, wherein the prohibited BWP for the positioning session with the UE is determined by the location based on identified BWPs that will interfere with location information measurements performed by the UE during the positioning session.

In one implementation (28), a New Radio (NR) Node B (gNB) in a wireless network that is serving a user equipment (UE), the NR gNB configured to support location determination of the UE, comprising: at least one external interface configured to communicate with entities in the wireless network; at least one memory; and at least one processor coupled to the at least one external interface and the at least one memory, the at least one processor configured to: receive a request for Bandwidth Part (BWP) information from a location server via the at least one external interface; send a response with BWP information to the location server via the at least one external interface; forward assistance data determined by the location server using the BWP information to the UE via the at least one external interface; transmit positioning reference signals to be measured by the UE via the at least one external interface; and forward location information measured from the positioning reference signals by the UE using the assistance data to the location server via the at least one external interface, wherein a location of the UE is determined by the location server based on the location information.

There may be some implementations (29) of the above-described NR gNB (28), wherein the request for BWP information and the response with BWP information are transmitted using an NR Positioning Protocol A (NRPPa).

There may be some implementations (30) of the above-described NR gNB (29), wherein the BWP information comprises an active BWP for the UE, a list of configured BWPs or both.

There may be some implementations (31) of the above-described NR gNB (30), wherein the request for BWP information includes an estimate of a positioning session time for the UE, wherein the list of configured BWPs comprises BWPs that will be active during the positioning session time.

There may be some implementations (32) of the above-described NR gNB (31), wherein the assistance data comprises assistance data for the active BWP, the list of configured BWPs that will be active during the positioning session time, or both.

There may be some implementations (33) of the above-described NR gNB (32), wherein the assistance data further comprises information for positioning reference signals transmitted by the serving gNB and neighbor gNBs in the wireless network that are intra-frequency with respect to the active BWP, the list of configured BWPs that will be active during the positioning session time, or both.

There may be some implementations (34) of the above-described NR gNB (30), wherein the BWP information further comprises a BWP switching pattern for the serving gNB.

There may be some implementations (35) of the above-described NR gNB (34), wherein the assistance data comprises information for positioning reference signals transmitted by the serving gNB and neighbor gNBs in the wireless network that are intra-frequency with respect to a new BWP, wherein the BWP switching pattern indicates a switch of the UE by the serving gNB to the new BWP.

There may be some implementations (36) of the above-described NR gNB (28), wherein the at least one processor is further configured to: receive a preferred BWP for the UE from the location server, wherein the preferred BWP is determined by the location server using the BWP information from the serving gNB and BWP information from the neighbor gNBs, wherein the at least one processor is configured to transmit the positioning reference signals to be measured by the UE by being configured to transmit the positioning reference signals via the at least one external interface using the preferred BWP.

There may be some implementations (37) of the above-described NR gNB (36), wherein the preferred BWP comprises a single BWP or a list of BWPs.

There may be some implementations (38) of the above-described NR gNB (36), wherein the at least one processor is further configured to switch the UE to a BWP included in the preferred BWP.

There may be some implementations (39) of the above-described NR gNB (28), wherein the at least one processor is further configured to: receive prohibited BWP for a positioning session with the UE from the location server via the at least one external interface, wherein the prohibited BWP are determined by the location server using the BWP information from the serving gNB and BWP information from the neighbor gNBs; wherein the at least one processor is configured to transmit the positioning reference signals to be measured by the UE by being configured to transmit the positioning reference signals via the at least one external interface using a non-prohibited BWP.

There may be some implementations (40) of the above-described NR gNB (39), wherein the prohibited BWP comprises a single BWP or a list of BWPs.

There may be some implementations (41) of the above-described NR gNB (39), wherein the prohibited BWP for the positioning session with the UE are determined by the location based on identified BWPs for which there are insufficient neighbor gNBs to transmit positioning reference signals that are intra-frequency with respect to the identified BWPs.

There may be some implementations (42) of the above-described NR gNB (39), wherein the BWP information comprises an identification of BWPs used for transmission and reception, wherein the prohibited BWP for the positioning session with the UE is determined by the location based on identified BWPs that will interfere with location information measurements performed by the UE during the positioning session.

In one implementation (43), a New Radio (NR) Node B (gNB) in a wireless network that is serving a user equipment (UE), the NR gNB configured to support location determination of the UE, comprising: means for receiving a request for Bandwidth Part (BWP) information from a location server; means for sending a response with BWP information to the location server; forwarding assistance data determined by the location server using the BWP information to the UE; means for transmitting positioning reference signals to be measured by the UE; and means for forwarding location information measured from the positioning reference signals by the UE using the assistance data to the location server, wherein a location of the UE is determined by the location server based on the location information.

In one implementation (44), a non-transitory storage medium including program code stored thereon, the program code is operable to cause at least one processor in a New Radio (NR) Node B (gNB) in a wireless network that is serving a user equipment (UE) to support location determination of the UE, comprising: program code to receiving a request for Bandwidth Part (BWP) information from a location server; program code to send a response with BWP information to the location server; program code to forward assistance data determined by the location server using the BWP information to the UE; program code to transmit positioning reference signals to be measured by the UE; and program code to forward location information measured from the positioning reference signals by the UE using the assistance data to the location server, wherein a location of the UE is determined by the location server based on the location information.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting location determination of a user equipment (UE) performed by a location server in a wireless network, the method comprising:
   sending a request for Bandwidth Part (BWP) information to a first entity, wherein the first entity comprises the UE or a serving New Radio (NR) Node B (gNB) in the wireless network that is serving the UE;
   receiving a response with BWP information from the first entity;
   determining assistance data using the BWP information;
   sending the assistance data to the UE;
   receiving from the UE location information measured by the UE using the assistance data; and
   determining a location of the UE based on the location information.

2. The method of claim 1, wherein the first entity is the serving gNB and wherein the request for BWP information and the response with BWP information are transmitted using an NR Positioning Protocol A (NRPPa).

3. The method of claim 2, wherein the BWP information comprises an active BWP for the UE, a list of configured BWPs or both.

4. The method of claim 3, wherein the request for BWP information includes an estimate of a positioning session time for the UE, wherein the list of configured BWPs comprises BWPs that will be active during the positioning session time.

5. The method of claim 4, wherein the assistance data comprises assistance data for the active BWP, the list of configured BWPs that will be active during the positioning session time, or both.

6. The method of claim 5, wherein the assistance data further comprises information for positioning reference signals transmitted by the serving gNB and neighbor gNBs in the wireless network that are intra-frequency with respect to the active BWP, the list of configured BWPs that will be active during the positioning session time, or both.

7. The method of claim 3, wherein the BWP information further comprises a BWP switching pattern for the serving gNB.

8. The method of claim 7, wherein the assistance data comprises information for positioning reference signals transmitted by the serving gNB and neighbor gNBs in the wireless network that are intra-frequency with respect to a new BWP, wherein the BWP switching pattern indicates a switch of the UE by the serving gNB to the new BWP.

9. The method of claim 2, further comprising:
   receiving BWP information from neighbor gNBs in the wireless network;
   determining a preferred BWP for the UE using the BWP information from the serving gNB and the BWP information from the neighbor gNBs; and
   sending the preferred BWP to the serving gNB.

10. The method of claim 9, wherein the preferred BWP comprises a single BWP or a list of BWPs.

11. The method of claim 9, wherein the serving gNB switches the UE to a BWP included in the preferred BWP.

12. The method of claim 2, the method further comprising:
    receiving BWP information from neighbor gNBs in the wireless network;
    determining prohibited BWP for a positioning session with the UE using the BWP information from the serving gNB and the BWP information from the neighbor gNBs; and
    sending the prohibited BWP to the serving gNB.

13. The method of claim 12, wherein the prohibited BWP comprises a single BWP or a list of BWPs.

14. The method of claim 12, wherein determining the prohibited BWP for the positioning session with the UE comprises identifying BWPs for which there are insufficient neighbor gNBs to transmit positioning reference signals that are intra-frequency with respect to the identified BWPs.

15. The method of claim 12, wherein the BWP information comprises an identification of BWPs used for transmission and reception, wherein determining the prohibited BWP for the positioning session with the UE comprises identifying BWPs that will interfere with location information measurements performed by the UE during the positioning session.

16. The method of claim 1, wherein the first entity is the UE and wherein the request for BWP information and the response with BWP information are transmitted during a capability exchange using a Long Term Evolution Positioning Protocol (LPP).

17. The method of claim 16, wherein the BWP information comprises an active BWP for the UE, a list of configured BWPs, or both.

18. The method of claim 17, wherein the BWP information further comprises an on-demand request for positioning reference signals on the active BWP so that the UE can measure location information using positioning signals that are intra-frequency with respect to the active BWP.

19. The method of claim 17, wherein the BWP information further comprises an ordered list of BWPs based on a prior usage of BWPs by the serving gNB.

20. A location server in a wireless network configured to support location determination of a user equipment (UE) comprising:
    a network interface configured to communicate with entities in the wireless network;
    at least one memory; and
    at least one processor coupled to the network interface and the at least one memory, the at least one processor configured to:
    send a request for Bandwidth Part (BWP) information to a first entity, via the network interface, wherein the first entity comprises the UE or a serving New Radio (NR) Node B (gNB) in the wireless network that is serving the UE;
    receive a response with BWP information from the first entity via the network interface;
    determine assistance data using the BWP information;
    send the assistance data to the UE via the network interface;
    receive from the UE, via the network interface, location information measured by the UE using the assistance data; and
    determine a location of the UE based on the location information.

21. The location server of claim 20, wherein the first entity is the serving gNB and wherein the request for BWP information and the response with BWP information are transmitted using an NR Positioning Protocol A (NRPPa).

22. The location server of claim 21, wherein the BWP information comprises an active BWP for the UE, a list of configured BWPs or both.

23. The location server of claim 22, wherein the request for BWP information includes an estimate of a positioning session time for the UE, wherein the list of configured BWPs comprises BWPs that will be active during the positioning session time.

24. The location server of claim 23, wherein the assistance data comprises assistance data for the active BWP, the list of configured BWPs that will be active during the positioning session time, or both.

25. The location server of claim 24, wherein the assistance data further comprises information for positioning reference signals transmitted by the serving gNB and neighbor gNBs in the wireless network that are intra-frequency with respect to the active BWP, the list of configured BWPs that will be active during the positioning session time, or both.

26. The location server of claim 22, wherein the BWP information further comprises a BWP switching pattern for the serving gNB.

27. The location server of claim 26, wherein the assistance data comprises information for positioning reference signals transmitted by the serving gNB and neighbor gNBs in the wireless network that are intra-frequency with respect to a new BWP, wherein the BWP switching pattern indicates a switch of the UE by the serving gNB to the new BWP.

28. The location server of claim 21, wherein the at least one processor is further configured to:
receive BWP information from neighbor gNBs in the wireless network via the network interface;
determine a preferred BWP for the UE using the BWP information from the serving gNB and the BWP information from the neighbor gNBs; and
send the preferred BWP to the serving gNB via the network interface.

29. The location server of claim 28, wherein the preferred BWP comprises a single BWP or a list of BWPs.

30. The location server of claim 28, wherein the serving gNB switches the UE to a BWP included in the preferred BWP.

31. The location server of claim 21, wherein the at least one processor is further configured to:
receive BWP information from neighbor gNBs in the wireless network via the network interface;
determine prohibited BWP for a positioning session with the UE using the BWP information from the serving gNB and the BWP information from the neighbor gNBs; and
send the prohibited BWP to the serving gNB via the network interface.

32. The location server of claim 31, wherein the prohibited BWP comprises a single BWP or a list of BWPs.

33. The location server of claim 31, wherein the at least one processor is configured to determine the prohibited BWP for the positioning session with the UE by being configured to identify BWPs for which there are insufficient neighbor gNBs to transmit positioning reference signals that are intra-frequency with respect to the identified BWPs.

34. The location server of claim 31, wherein the BWP information comprises an identification of BWPs used for transmission and reception, wherein the at least one processor is configured to determine the prohibited BWP for the positioning session with the UE by being configured to identify BWPs that will interfere with location information measurements performed by the UE during the positioning session.

35. The location server of claim 20, wherein the first entity is the UE and wherein the request for BWP information and the response with BWP information are transmitted during a capability exchange using a Long Term Evolution Positioning Protocol (LPP).

36. The location server of claim 35, wherein the BWP information comprises an active BWP for the UE, a list of configured BWPs, or both.

37. The location server of claim 36, wherein the BWP information further comprises an on-demand request for positioning reference signals on the active BWP so that the UE can measure location information using positioning signals that are intra-frequency with respect to the active BWP.

38. The location server of claim 36, wherein the BWP information further comprises an ordered list of BWPs based on a prior usage of BWPs by the serving gNB.

39. A location server in a wireless network configured to support location determination of a user equipment (UE), comprising:
means for sending a request for Bandwidth Part (BWP) information to a first entity, wherein the first entity comprises the UE or a serving New Radio (NR) Node B (gNB) in the wireless network that is serving the UE;
means for receiving a response with BWP information from the first entity;
means for determining assistance data using the BWP information;
means for sending the assistance data to the UE;
means for receiving from the UE location information measured by the UE using the assistance data; and
means for determining a location of the UE based on the location information.

40. A non-transitory storage medium including program code stored thereon, the program code is operable to cause at least one processor in a location server in a wireless network to support location determination of a user equipment (UE), comprising:
program code to send a request for Bandwidth Part (BWP) information to a first entity, wherein the first entity comprises the UE or a serving New Radio (NR) Node B (gNB) in the wireless network that is serving the UE;
program code to receive a response with BWP information from the first entity;
program code to determine assistance data using the BWP information;
program code to send the assistance data to the UE;
program code to receive from the UE location information measured by the UE using the assistance data; and
program code to determine a location of the UE based on the location information.

* * * * *